US008914367B2

(12) United States Patent
Toebes et al.

(10) Patent No.: US 8,914,367 B2
(45) Date of Patent: Dec. 16, 2014

(54) SOCIALLY COLLABORATIVE FILTERING FOR PROVIDING RECOMMENDED CONTENT TO A WEBSITE FOR PRESENTATION TO AN IDENTIFIED USER

(75) Inventors: John Toebes, Cary, NC (US); Matthew Kuhlke, San Francisco, CA (US); Ari Daniel Scheinman, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 1017 days.

(21) Appl. No.: 12/334,910

(22) Filed: Dec. 15, 2008

(65) Prior Publication Data

US 2010/0153411 A1 Jun. 17, 2010

(51) Int. Cl.
*G06F 17/30* (2006.01)

(52) U.S. Cl.
CPC .............................. *G06F 17/30867* (2013.01)
USPC .......................................... 707/737; 707/754

(58) Field of Classification Search
USPC ........... 707/999.104, 999.107, 751, 944, 723, 707/728, 748, 798, 737, 754; 715/234, 745, 715/719; 709/203, 217
See application file for complete search history.

(56) References Cited

U.S. PATENT DOCUMENTS

| | | | |
|---|---|---|---|
| 5,918,014 A | | 6/1999 | Robinson |
| 5,933,827 A * | | 8/1999 | Cole et al. .............................. 1/1 |
| 6,064,980 A | | 5/2000 | Jacobi et al. |
| 6,088,722 A * | | 7/2000 | Herz et al. ..................... 709/217 |
| 6,487,557 B1 * | | 11/2002 | Nagatomo ............................. 1/1 |
| 6,681,247 B1 | | 1/2004 | Payton |
| 6,697,800 B1 | | 2/2004 | Jannink et al. |
| 7,343,365 B2 | | 3/2008 | Farnham et al. |
| 2002/0065802 A1 | | 5/2002 | Uchiyama |
| 2002/0178257 A1 | | 11/2002 | Cerrato |
| 2003/0087652 A1 * | | 5/2003 | Simon et al. .................. 455/466 |
| 2003/0105681 A1 | | 6/2003 | Oddo |
| 2003/0106057 A1 | | 6/2003 | Perdon |
| 2004/0025174 A1 | | 2/2004 | Cerrato |

(Continued)

FOREIGN PATENT DOCUMENTS

| | | |
|---|---|---|
| WO | 2005055102 | 6/2005 |
| WO | 2007058723 | 5/2007 |
| WO | 2007063162 | 6/2007 |

OTHER PUBLICATIONS

Toebes, "Socially Collaborative Filtering: Give Users Relevant Content", [online] (Jun. 2008) [retrieved Nov. 9, 2010]. Retrieved from the Internet: <URL: http://www.cisco.com/web/solutions/cmsg/C11-484492-00_Filtering_wp.pdf>, pp. 1-10.

(Continued)

*Primary Examiner* — Jacob F Bétit
*Assistant Examiner* — Bao Tran
(74) *Attorney, Agent, or Firm* — Leon R. Turkevich

(57) ABSTRACT

In one embodiment, a method comprises receiving, by a website server device providing a website service, a request from an identified user of a user device, the request requesting network content provided within the website service; determining by the website server device an absence of new network content within the website service relative to a last prior access by the identified user to the website service; and obtaining, by the website server device for presentation to the identified user within the website service, an ordered list of network items most likely to be preferred by the identified user.

12 Claims, 12 Drawing Sheets

(56) References Cited

U.S. PATENT DOCUMENTS

| | | | |
|---|---|---|---|
| 2004/0242235 A1* | 12/2004 | Witana | 455/452.2 |
| 2004/0267388 A1 | 12/2004 | Perdon | |
| 2005/0038819 A1* | 2/2005 | Hicken et al. | 707/104.1 |
| 2005/0204276 A1 | 9/2005 | Hosea et al. | |
| 2006/0129906 A1* | 6/2006 | Wall | 715/500 |
| 2007/0005437 A1 | 1/2007 | Stoppelman | |
| 2007/0094208 A1 | 4/2007 | Cerrato | |
| 2007/0124296 A1 | 5/2007 | Toebes | |
| 2007/0239554 A1 | 10/2007 | Lin et al. | |
| 2008/0139112 A1* | 6/2008 | Sampath et al. | 455/3.04 |
| 2009/0070412 A1* | 3/2009 | D'Angelo et al. | 709/203 |
| 2009/0234828 A1* | 9/2009 | Tu | 707/5 |
| 2009/0327270 A1* | 12/2009 | Teevan et al. | 707/5 |
| 2013/0304691 A1* | 11/2013 | Pinckney et al. | 706/52 |

OTHER PUBLICATIONS

U.S. Appl. No. 12/109,549, filed Apr. 25, 2005, Toebes et al.
U.S. Appl. No. 11/947,298, filed Nov. 29, 2007, Toebes et al.
U.S. Appl. No. 11/860,115, filed Sep. 24, 2007, Pelton.
U.S. Appl. No. 11/812,452, filed Jun. 19, 2007, Kuhlke.
"My Best Segments", [online] Jun. 16, 2007, [retrieved Jan. 28, 2008]. Retrieved from the Internet: <URL: http://web.archive.org/web/20070616140103/http://www.claritas.com/MyBestSegments/Default.jsp>, pp. 1-2.
Wikipedia, "Collaborative filtering", [online], (Sep. 28, 2007) [retrieved Oct. 11, 2007]. Retrieved from the Internet: <URL: http://en.wikipedia.org/w/index.php?title=Collaborative_filtering&printable=yes>, pp. 1-6.
Hirschorn, "The Digital-Music Mosh Pit", [online], The Atlantic.com (Jan. 2007) [retrieved Jan. 28, 2008]. Retrieved from the Internet: <URL: http://www.theatlantic.com/doc/200701/hirschorn-radio>, pp. 1-4.
"Digital Interactive Video Exploration & Reflection (DIVER)", [online], Stanford University (Jan. 12, 2007) [retrieved Jan. 28, 2008]. Retrieved from the Internet: <URL: http://web.archive.org/web/20070112195110/http://diver.stanford.edu/>, 1 page.
"Digital Interactive Video Exploration & Reflection (DIVER)—Overview", [online], Stanford University (Feb. 8, 2007) [retrieved Jan. 28, 2008]. Retrieved from the Internet: <URL: http://web.archive.org/web/20070208005206/diver.stanford.edu/what.html>, 1 page.
"Digital Interactive Video Exploration & Reflection (DIVER)—Overview of DIVER system (panoramic capture)", [online], Stanford University (Feb. 8, 2007) [retrieved Jan. 28, 2008]. Retrieved from the Internet: <URL: http://web.archive.org/web/20070208005317/diver.stanford.edu/overview.html>, 1 page.
"Digital Interactive Video Exploration & Reflection (DIVER)—Teacher Education", [online], Stanford University (Feb. 8, 2007) [retrieved Jan. 28, 2008]. Retrieved from the Internet: <URL: http://web.archive.org/web/20070208005357/diver.stanford.edu/teacherEd.html>, 1 page.
"Digital Interactive Video Exploration & Reflection (DIVER)—What Makes Diver Different?", [online], Stanford University (Feb. 8, 2007) [retrieved Jan. 28, 2008]. Retrieved from the Internet: <URL: http://web.archive.org/web/20070208005336/diver.stanford.edu/different.html>, 1 page.
Exeros DataMapperTM Data Sheet, [online] (Mar. 29, 2006) [retrieved Jan. 28, 2008]. Retrieved from the Internet: <URL: http://web.archive.org/web/20060329012647/http://www.exeros.com/pdf/DataMapperDataSheet.pdf>, pp. 1-2.
"Five Across Connect 1.8 Community Builder Site Management", [online](Jul. 2, 2007) [retrieved Jan. 28, 2008]. Retrieved from the Internet: <URL: http://web.archive.org/web/20070702052520/www.fiveacross.com/product/connect_provider.html>, 2 pages.
"Five Across Connect 1.8 Community Builder", [online](Jul. 1, 2007), [retrieved Jan. 28, 2008]. Retrieved from the Internet: <URL: http://web.archive.org/web/20070701114331/http://www.fiveacross.com/product/index.html>, 1 page.
Five Across Connect 1.8 Data sheet, [online] (Jul. 10, 2007) [retrieved Jan. 28, 2008]. Retrieved from the Internet: <URL: http://web.archive.org/web/20070710104211/http://www.fiveacross.com/product/Connect_1_8_datasheet+FINAL.pdf>, 1 page.
"Five Across Connect 1.8 Community Builder Implementation" [online] (Jul. 1, 2007) [retrieved Jan. 28, 2008]. Retrieved from the Internet: <URL: http://web.archive.org/web/20070701223046/www.fiveacross.com/product/implementation.html>, 1 page.
"Five Across Connect 1.8 Community Builder End User Features", [online] (Jul. 2, 2007) [retrieved Jan. 28, 2008]. Retrieved from the Internet: <URL: http://web.archive.org/web/20070702052827/www.fiveacross.com/product/connect_end_user.html>, pages 1-2.
"Pandora Radio—Listen to Free Internet Radio, Find New Music", [online], [retrieved on Oct. 11, 2007]. Retrieved from the Internet: <URL: http://pandora.com>, 1 page.
"Pandora—About the Music Genome Project", [online], [retrieved on Oct. 11, 2007]. Retrieved from the Internet: <URL: http://pandora.com/corporate.mgp>, 1 page.
Techcrunch.com, "Taboola Lands $1.5 Million, Powers Video Discovery" [online] (Nov. 17, 2007). [retrieved Jan. 28, 2008]. Retrieved from the Internet: <URL: http://www.techcrunch.com/2007/11/14/taboola-lands-15-million-powers-video-discovery/>, pp. 1-4.

* cited by examiner

| User Index | Item Affinity Value | Item ID |
|---|---|---|
| P1 | 375 | I383 |
| | 286 | I1 |
| | 137 | I221 |
| | 122 | I323 |
| | ... | ... |
| | 2 | I159 |
| | 0 | I722 |
| | 0 | I23 |
| | ... | ... |
| | 0 | I21 |
| | -4 | I676 |
| | -46 | I993 |
| | -80 | I65 |

Figure 6

| Item Index | User Affinity Value | User ID |
|---|---|---|
| I1 | 301 | P362 |
| | 297 | P259 |
| | 287 | P35 |
| | 286 | P1 |
| | 264 | P377 |

Figure 7

Personally Interesting Content Relative to User P1 (PI_P1):
- Based on Gestures by User P1 toward Preferred Network Items (Having Highest Relative Item Affinity Values by User P1) (Includes Gestures Toward 1st Portion A of Website Content Consumed by User P1);

- Closest Network Users (NU1) Identified from Preferred Network Items (Users Having Highest User Affinity Values for each Preferred Network Item);

- Identify Personally Interesting Content based on finding the Preferred Network Items for each of the Closest Network Users NU1 (Highest Relative Item Affinity Values for each Closest Network User);

- Filtered to Exclude Network Content (A) already Consumed by User P1

⸺ 122

Socially Related Content Relative to User Request R within W (SRC-W):
- Determined from Second Network Users NU2 (Having Highest User Affinity Values for Network Content Requested in User Request R)

- Identify Second Preferred Network Items for each Second Network User (Highest Relative Item Affinity Values for each Second Network User)

- Filtered to Exclude Input Set and Network Content (A) already Consumed by User P1

⸺ 125

Contextually Related Content (CRC_W): Identified by Website Server Device as 2nd Portion B of Website Content Not Consumed by User P1 or Closest Network User NU1 (e.g., Least Popular Content)

SOCIALLY COLLABORATIVE FILTERING FOR PROVIDING RECOMMENDED CONTENT TO A WEBSITE FOR PRESENTATION TO AN IDENTIFIED USER

CROSS REFERENCE TO RELATED APPLICATIONS

This application is related to commonly-assigned U.S. patent application Ser. No. 11/947,298, filed Nov. 29, 2007 and entitled "Socially Collaborative Filtering".

TECHNICAL FIELD

The present disclosure generally relates to website content management and website content delivery management, where content is loaded into a website for presentation to a user of the website. The present disclosure also generally relates to devices that perform filter-based searching of data available via information networks such as a wide area network (for example, the World Wide Web or the Internet), for example collaborative filtering.

BACKGROUND

The exponential growth of information available to users of various information networks (for example, broadcast, satellite, or cable television; wide area networks such as the World Wide Web or the Internet), requires organizing the presentation of the available information in an efficient and effective manner. Collaborative filtering attempts to organize presentation of information to a user in a wide area network (for example, the World Wide Web) based on automatically predicting the interests of a user by establishing relationships between items of interest to the user (for example, items recently viewed by the user at a commercial website) and other items that have been determined as of interest to other users. Item-based collaborative filtering, illustrated for example at the website "amazon.com" (users who bought x also bought y) is based on the premise that if a number of users purchase both items "x" and "y", then another user viewing (or purchasing) the item "x" also may be interested in the item "y".

Other examples of filtering content include human directed programming (for example, conventional network television programming), demographic based targeting that classifies individuals according to demographics, content based targeting (for example, Google AdSense available on the World Wide Web at the website address "google.com/adsense"), user defined filters (for example, a TiVo® WishList search on a commercially-available TiVo® Digital Video Recorder), popularity based targeting, domain-specific knowledge recommendation systems (for example, available at the website address "pandora.com") and ratings-based filtering (for example, a ratings system provided by the online service "Netflix" at the website "netflix.com").

Web site operators can attract new users based on the network content of their website service. Website services can utilize data structures stored on user devices, referred to as "cookies", enabling a user to determine whether new content (e.g., new messages) have been added to a website service. However, website operators need to provide new and/or updated content via their website service on a regular basis in order to ensure existing users continue to utilize their website service.

BRIEF DESCRIPTION OF THE DRAWINGS

Reference is made to the attached drawings, wherein elements having the same reference numeral designations represent like elements throughout and wherein:

FIG. 6 illustrates example item affinity values for a given user based on the corresponding user selection preferences, according to an example embodiment.

FIG. 7 illustrates example user affinity values provided by network users for a given network item, according to an example embodiment.

FIG. 9 illustrates attributes of the personally interesting content, the socially related content, and the contextually related content illustrated in FIG. 8.

DESCRIPTION OF EXAMPLE EMBODIMENTS

Overview

Figure 1:
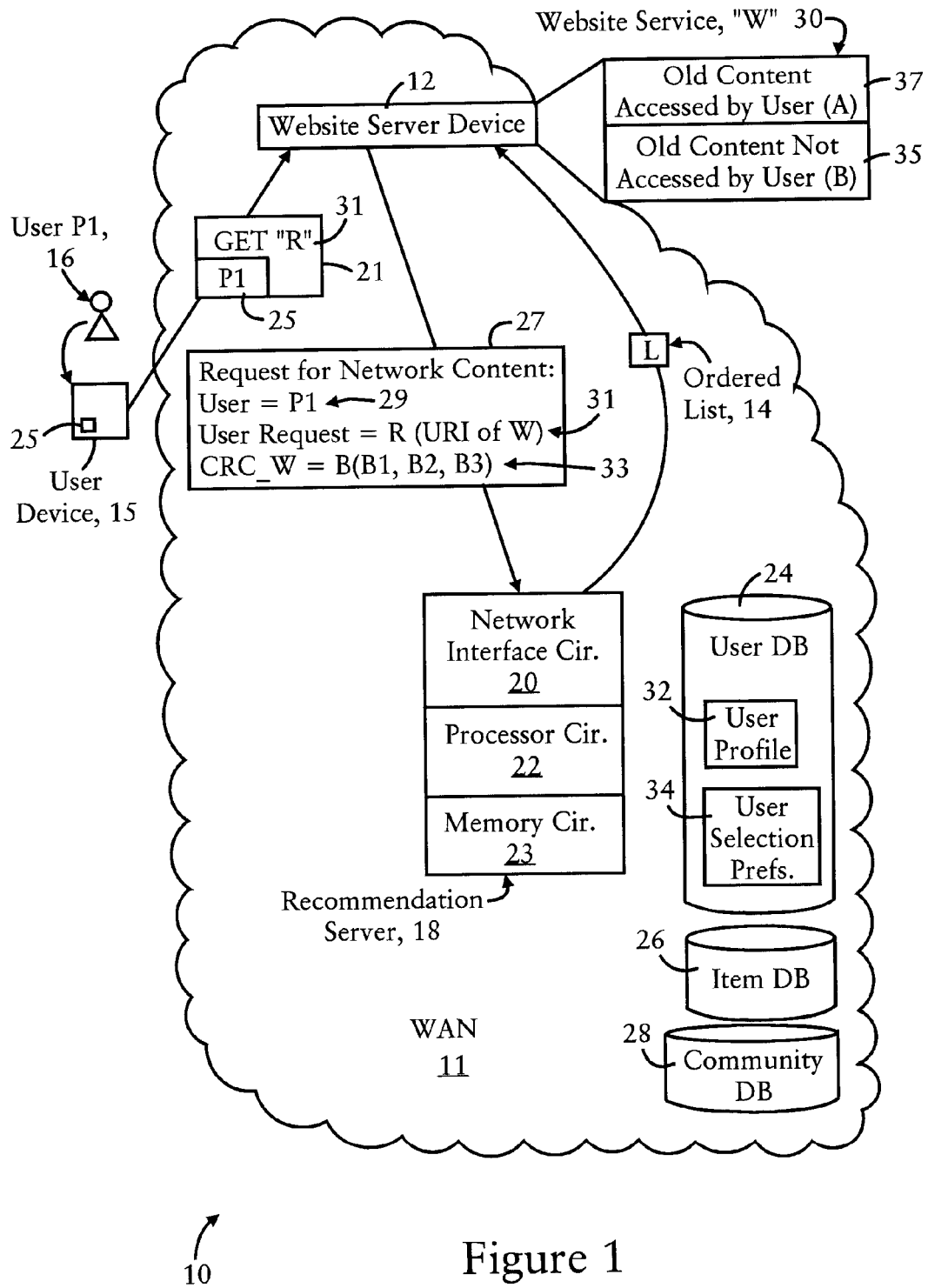
FIG. 1 illustrates an example system for supplying to a website server device an ordered list of network items most likely to be preferred by an identified user, according to an example embodiment.

In one embodiment, a method comprises receiving, by a website server device providing a website service, a request from an identified user of a user device, the request requesting network content provided within the website service; determining by the website server device an absence of new network content within the website service relative to a last prior access by the identified user to the website service; and obtaining, by the website server device for presentation to the identified user within the website service, an ordered list of network items most likely to be preferred by the identified user.

In another embodiment, a method comprises receiving, by a server device, a recommendation request from a website server device, the recommendation request specifying an identified user having sent a request for network content to a website service provided by the website server device; generating by the server device an ordered list of network items most likely to be preferred by the identified user based on the network content requested by the user; and sending the ordered list by the server device to the website server device for presentation within the website service of the ordered list to the identified user.

In yet another embodiment, an apparatus comprises a network interface circuit and a processor circuit. The network interface circuit is configured for configured for receiving a recommendation request from a website server device. The recommendation request specifies an identified user having sent a request for network content to a website service provided by the website server device. The processor circuit is configured for generating an ordered list of network items most likely to be preferred by the identified user based on the network content requested by the user. The network interface circuit further is configured for sending the ordered list to the website server device for presentation within the website service of the ordered list to the identified user.

DETAILED DESCRIPTION

Particular embodiments apply socially collaborative filtering to enable a website server device, providing a website service, to obtain personalized content for an identified user that is requesting network content from the website service. In particular, the disclosed socially collaborative filtering enables a website server device, having an absence of new network content, to obtain an ordered list of network items most likely to be preferred by the identified user. The particular embodiments thus enable a website server device to obtain new content that is of most interest to the identified user in the event that the website service provided by the website server device does not have any new network content relative to the last prior access by the identified user. Consequently, a website server device can ensure the identified user maintains interest in the website service, even though the website service does not have any new network content within the website service to present to the user.

FIG. 1 illustrates an example system 10 for supplying to a website server device 12 an ordered list "L" 14 of network items most likely to be preferred by an identified user "P1" 16, according to an example embodiment. The example system 10 can include a website server device (i.e., website server machine or website server apparatus) 12 configured for providing a website service "W" 30 to an identified user "P1" 16 of a user device (e.g., a microprocessor-based device executing a web browser) 15 via a wide area network (WAN) 11. The system 10 also can include a recommendation server 18, described below.

The user 16 of the user device 15 can send a client request 21 via the WAN 11 for network content provided within the website service 30, for example based on sending a web request 21 (e.g., a hypertext transport protocol (HTTP) Get Request) specifying a uniform resource identifier (URI) "R" 31 for the website service "W". The client request 21 can include a data structure (e.g., a "cookie") 25 that is stored on the user device 15 and identifying access activities by the user "P1" 16, for example the last time that the identified user "P1" 16 visited the website service 30. In response to the website server device 12 receiving the client request 21 for network content, the website server device 12 can determine from the supplied data structure 25 whether there is any new content within the website service 30 relative to the last prior access to the website service 30 by the identified user "P1" 16.

The website server device 12 also can determine whether there is any new content within the website service 30, relative to the last prior access by the identified user "P1" 16, based on retrieving a server-side data structure that can store the same information as the data structure 25: in this example, the server-side data structure can be retrieved by the website server device 12 from a local mass storage device (e.g., a file server connected to the website server device 12 or reachable via a local area network) in response to the website server device 12 identifying the user 16 having submitted the request 31. Hence, user of the server-side data structure can eliminate the necessity of the data structure 25 supplied in the request 31.

If the website server device 12 determines an absence of any new network content within the website service 30 relative to the last prior access by the identified user "P1" 16, the website server device 12 can send a recommendation request 27 via the WAN 11 to the recommendation server 18. The recommendation request 27 can specify a user identifier 29 (e.g., by user ID associated with the website service, etc.) "P1" 16, and a request identifier 31 specifying the user request "R" for the requested network content (e.g., the URI "R" specified in the user request).

As described below, the recommendation request 27 also can identify contextually related content ("CRC_W") 33 that is identified by the website server device 12 as website content 35 that is contextually related to the website service "W" 30, but that has not been consumed by the user (e.g., unpopular content). As illustrated in FIG. 1, the website service 30 is illustrated as having a first portion 37 of the network content ("A") within the website service 30 and that has been consumed (e.g., viewed, heard, downloaded, etc.) by the user "P1" 16 prior to the transmission of the current client request 21, and a second portion 35 of the network content ("B") that was available at the last prior access by the identified user 16, but was not accessed or consumed by the identified user 16. In other words, the website server device 12 can determine that the portion "B" 35 is contextually related to the user request "R" 21, for example based on the availability of the portion "B" 35 within the website service 30. The website server device 12 might be incapable of determining whether the portion "B" would be considered unpopular or undesirable by the user 16 or similar users of the website service 30. Hence, the website server device 12 can identify in the request 27 the contextually related content (CRC_W) 33 as a portion "B" 35 of the network content within the website service 30 that has not been consumed by the user 16, enabling the recommendation server 18 to determine whether at least a portion of the content "B" 35 not consumed by the user 16 (e.g., network items "B1", "B2", and/or "B3") should be presented in the ordered list 14 of recommendations.

The example recommendation server (i.e., recommendation server machine or recommendation server apparatus) 18 includes a network interface circuit 20, a processor circuit 22, and a memory circuit 23. In response to the network interface circuit 20 receiving the recommendation request 27 from the website server device 12, the processor circuit 22 can generate an ordered list "L" 14 of network items most likely to be preferred by the identified user 16. The ordered list "L" 14 can be generated by the processor circuit 22 of the recommendation server 18 based on identifying user selection preferences of the identified user 16. The user selection preferences of the identified user 16 are identified by the processor circuit 22 based on an accumulation of user selection inputs executed by the identified user 16, enabling identification of preferred network items chosen by the user 16 relative to available network items offered to the identified user as input options.

As described in further detail below, the accumulation of user selection inputs enables identification by the processor circuit 22 of first network users having the highest correlation of shared interests with the identified user "P1" 16, and identification of personally interesting content for the identified user "P1" 16, based on the processor circuit 22 determining the respective user selection preferences of each of the first network users having the shared interests with the identified user 16. The personally interesting content for the identified user "P1" also can be filtered (or sorted) based on the processor circuit 22 identifying socially related content relative to the website service 30, and the processor circuit 22 sorting the personally interesting content for the identified user "P1" relative to the socially related content determined relative to the website service 30.

In particular, the processor circuit 22 of the recommendation server 18 can provide recommendations to the website server device 12 that are personalized for the user "P1" 16 based on tracking user activities in order to identify user selection preferences. Any and all network-based activities by a user can be identified relative to the context presented to the user, namely the input options presented to the user. The user selection preferences can be identified based on accumulating the identified network-based activities relative to the context presented to the user, including not only accumulating the user selection inputs executed by the identified user, but also identifying and accumulating the input options that were presented (i.e., offered) to the user but ignored by the user. Consequently, the user selection inputs can be more precisely evaluated when compared in context with the other input options that were presented to the user (for example, at the same time as the input option selected by the user), but that were ignored by the identified user based on detecting the respective input options were not selected by the user. The accumulation of network-based activities relative to the context presented to the user can be executed by the recommendation server 18, and/or by distributed devices such as access devices providing access for user devices 15 to the wide area network 10, for example access routers deployed by access network service providers, head-end servers in content provider networks, etc. The accumulation of network-based activities also can be executed by customer premises devices having access to the network 10, such as a consumer set-top box, a consumer premises router (e.g., a commercially available Linksys® router), etc. The accumulation of the network-based activities can be stored in a network database 24, described below.

The accumulation of user selection inputs by the user, relative to the context of the input options presented to the user but ignored by the user, demonstrate "socially relevant gestures" that can be used by the recommendation server 18 to identify the user selection preferences. Socially relevant gestures can include: identifying the user for example based on user login or detecting a unique identification token (for example, an RFID tag, a digital signature, a cookie, etc.); identifying a physical or network location of the user (for example, based on presence information or locality information provided either explicitly or inherently by a user device utilized by the user to access the network); identifying content that the user has chosen historically with respect to viewed content (for example, tracking what television shows, movies, etc. a user has viewed and for how long, or identifying a location within presented content where a user changes his or her interest to other content or browsed content); identifying content or items that the user has commented on, for example within online forms or communities; identifying network access activities by the user, for example types of user devices used to access network items, duration of access, whether multiple access devices are concurrently utilized, etc.

The identification of the user selection preferences for a given user (based on having detected the socially relevant gestures of the user) can be used with network information maintained within the system in order to dynamically generate recommendations for the user that are based on a collaborative filtering of the user selection preferences with the network information. Hence, applying collaborative filtering to the user selection preferences in combination with the network information results in a socially collaborative filtering of content that is personalized precisely for the user.

Hence, socially relevant gestures for the identified user can be analyzed to determine personally interesting content for the user 16 relative to content that can be related to the website service 30 to determine the ordered list 14 of network items most likely to be preferred by the identified user 16, even if the none of the network items in the ordered list has ever been viewed by the identified user 16. Consequently, the socially collaborative filtering executed by the example embodiments can enable different users 16 accessing the same website service 30 to enjoy uniquely personal experiences, even when the different users access the very same website service 30 while the website service 30 does not include any new network content for presentation to the different users.

The personalized and context-sensitive recommendations 14 generated by the processor circuit 22 can be updated by the processor circuit 22 in response to each detected socially relevant gesture by a user. The example embodiments can update the user selection preferences for a given user in response to each successive user selection input, including the corresponding context, and in response successively generate corresponding updated recommendations for the user. For example, in response to an access device in the system 10 detecting that a user turns on his or her television set every weekday morning, the socially collaborative filtering executed by the example embodiments can determine from the user's socially relevant gestures that the user would most likely prefer a specific news channel, and in response present the user with his or her favorite TV news channel (for example, CNN as opposed to Fox News or local news). Detecting a request for a channel change can cause the example embodiments to provide the next favorite content based on the user selection preferences relying on the socially relevant gestures, for example sports news that is custom tailored for a specific sports category or team, and which does not provide any news related to certain sports teams disliked by the user Hence, the updating of the user selection preferences in response to each socially relevant gesture by a user can be used to increase an affinity for the network item being presented (i.e., offered) to the user, in other words strengthening the relationship between the user and the network item being presented to the user. The updating of the user selection preferences also can be used to decrease an affinity for network items being presented to the user in order to decrease the strength of the corresponding relationship, for example in the case of network items that are ignored by the user, or detection of socially relevant gestures demonstrating that the user exhibits a dislike for certain network items.

As described in further detail below, use of the term "network item" in this specification refers to online content that can be consumed by a user either directly via the network (for example, online videos, music, e-books, online articles, written commentary, etc.) or indirectly via the network (for example, downloading online content to local storage for future consumption), and network objects that explicitly represent tangible goods (or a collection thereof) that can be obtained by the user using the network for consumption thereof (for example, ordering DVD videos via "Netflix.com" or "Amazon.com", tangible goods such as books, videos, etc., via "Amazon.com", etc.). Hence, the term "network item" does not include ratings (for example, a star-based rating), etc. that may be associated with online content or network objects representing tangible goods; rather, such ratings are used to identify socially relevant gestures relative to identified network items.

Referring to FIG. 1, the network 11 includes devices (e.g., access routers, etc.) configured for detecting user selection inputs from user devices 15 under the control of an identifiable user 16. Example user devices 15 can include a remote control for an intelligent digital television system, a personal computer having a web browser, an IP based telephone (for example, a voice over IP telephone), and/or a web enabled cell phone that can be configured for wireless voice over IP communications. The IP telephone and the web-enabled cell phone also can include a web browser.

Each user device 15 can be configured for sending the user selection inputs to the network 11, either directly or via intermediate devices (for example, cable or satellite television set-top box configured for sending requests to the network 11; local access router at the customer premises, etc.) to a server (e.g., 12) configured for responding to the user selection inputs by supplying recommended content back to the requesting user device 15.

The network interface circuit 20 of the recommendation server 18 can be configured for detecting the user selection inputs from the user devices 15; the network interface circuit 20 also can be configured for accessing databases 24, 26, and/or 28, described below. The network item specified in the ordered list 14 to the website server device 12 can be implemented either as a reference (for example, a Uniform Resource Identifier (URI)) to the recommended content available from identifiable providers 30, or in the form of the actual content to be presented for consumption by the user 16 (i.e., consumed by the user) based on the server 18 retrieving the recommended content from the appropriate content provider or service provider (not shown). The personalized recommendations also can identify at least one network item already stored locally on the user device and that is indexed within the network 11, for example within any one of the databases 24, 26, or 28.

The example server 18 can be implemented as a single server that can be implemented at the head end of an access network 11 for a content provider offering content services to the user 16, the access network 11 providing access to other content providers or service providers via a wide area network such as the Internet; alternately, the example server 18 can be implemented as a distributed server system within the network 11, where a first server within the distributed server system receives the user inputs and updates the user selection preferences, described below, and a second server within the distributed server system determines and outputs the ordered list 14 of personalized recommendations to the website server device 12 based on the updated user selection preferences.

The example server 18 will be described herein within the context of a single, integrated server to simplify the description of the example embodiments.

Figure 5:
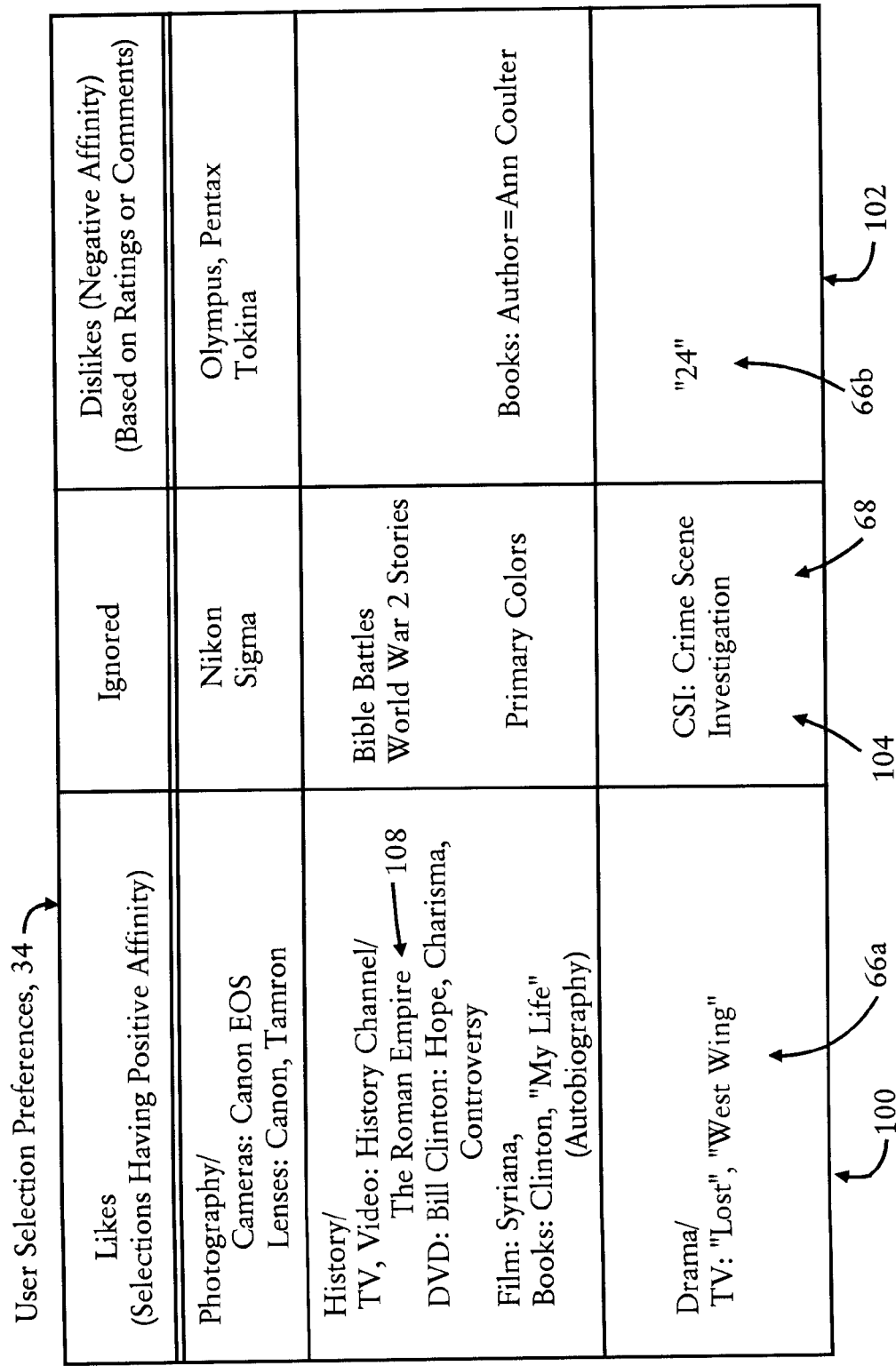
FIG. 5 illustrates example user selection preferences for an identified user accumulated based on the input options presented to the user, the user selection inputs executed by the identified user, and input options not having been selected by the identified user, according to an example embodiment.

The processor circuit 22 of the server 18 can generate personalized recommendations for the user 16 based on executing socially collaborative filtering based on retrieval of information that can be stored in a user database 24, an item database 26, and/or a community database 28. The user database 24 can be configured for storing information related to the user 16, including a user profile 32 and user selection preferences 34. The user profile 32 can include information about the user 16, including personal account subscription information related to establishment and maintenance of any network service utilized by the network devices 14; the user profile 32 also can include identification of other network users that have a close relationship with the identified user 16 (i.e., user-to-user relationships), for example "buddy lists" for instant messaging sessions or cell phone subscriptions, or users of online forums that the user 16 has identified as being "favorite" users or "disliked" users. The user selection preferences 34, described in further detail below with respect to FIG. 5, can illustrate the socially relevant gestures of the identified user 16 based on an accumulation of the user selection inputs executed by the identified user 16 relative to the context of those user selection inputs (i.e., relative to other input options that were concurrently presented to the user with the input option that was selected by the user). As described below, the socially relevant gestures for the identified user 16 can be used to establish various relationships, for example user-item relationships that identify the network items for which the identified user 16 demonstrates having the highest affinity (i.e., preference).

The item database 26 can be configured for storing information about network items that are available for presentation to the user, including item-to-item relationships and item-to-user relationships, described below. The community database 28 can include information identifying relationships between the identified user 16 and other elements of a community-based network service, for example messaging boards, Internet-based recommendation sites, Internet-based social community websites, etc., where the identified user 16 can identify himself or herself as having particular preferences in terms of political interests, hobbies, "favorite" users, "disliked" users, preferred content, or content to avoid. The community database 28 is not strictly necessary for implementation of the example embodiments, but can add to generation of additional socially relevant gestures.

Figure 2:
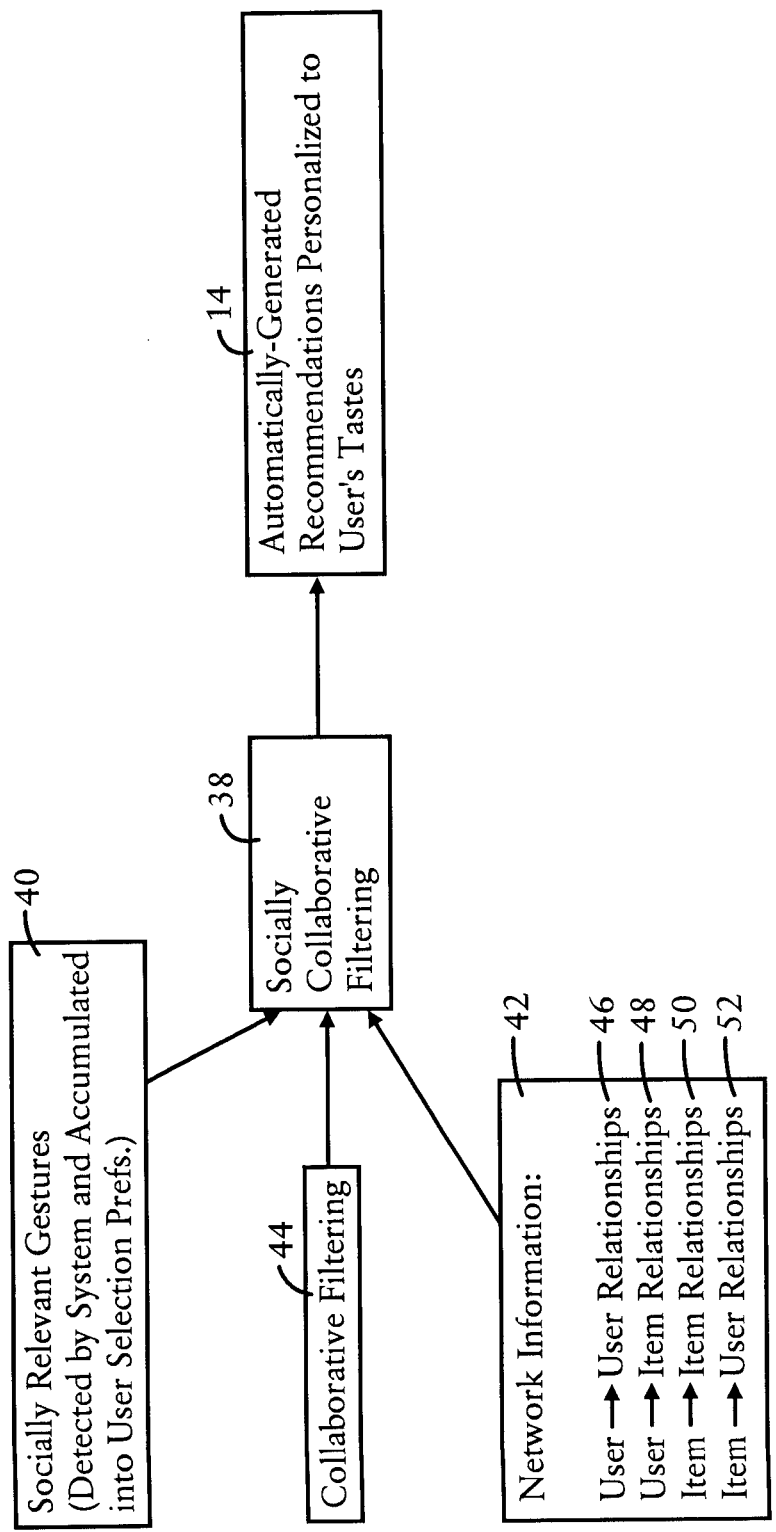
FIG. 2 illustrates an example execution of socially collaborative filtering for generation of the recommendations personalized to a user's tastes, according to an example embodiment.

FIG. 2 illustrates a summary example execution of socially collaborative filtering by the processor circuit of FIG. 1, according to an example embodiment. As described below, the processor circuit 22 can access any one of the databases 24, 26, and/or 28 in order to determine a list 14 of recommendations of network items that would most be preferred by the identified user 16 based on execution of socially collaborative filtering 38 by the processor circuit 22. The list 14 of recommendations of network items can include, for example, network items previously presented to the network user, and/or new network items that have not yet been presented to the user. In particular, the processor circuit 22 can execute socially collaborative filtering 38 based on applying the socially relevant gestures 40 exhibited by the user selection preferences 34 to available network information 42 using collaborative filtering techniques 44.

The network information 42 can include one-way relationships that demonstrate affinities of a given network object toward another network object. For example, the network information 42 can include one-way user-user relationships 46, one-way user-item relationships 48, one-way item-item relationships 50, and one-way item-user relationships 52. As described below, the processor circuit 22 can determine each of the relationships 46, 48, 50 and 52 based on socially relevant gestures 40, and store the relationships 46, 48, 50 and 52 in an appropriate database 24, 26, or 28 for future use, for example updating the relationships 46, 48, 50, or 52 in response to additional detected socially relevant gestures.

The user-to-user relationships 46, which can be determined and stored by the processor circuit 22 in the user profile 32 and/or the community database 28, can demonstrate specific affinity determined by the processor circuit 22 between one person toward another person, where a given person (A) can have a strong affinity toward another person (B) based on a close personal or business relationship, whereas the second person (B) may demonstrate a lesser affinity toward the first person (A) for example in the case of a manager or popular individual (B) being admired by the other person (A). Hence, the users A and B can demonstrate asymmetric (i.e., unequal) affinity values toward each other. The user-to-user relationships 46 typically are updated only when the relevant user (for example, A) establishes or updates (for example, modifies or deletes) the relationship with the other user (B); hence, the user-to-user relationships 46 are not updated as a result of the user (A)'s interactions with network items.

Figure 10:
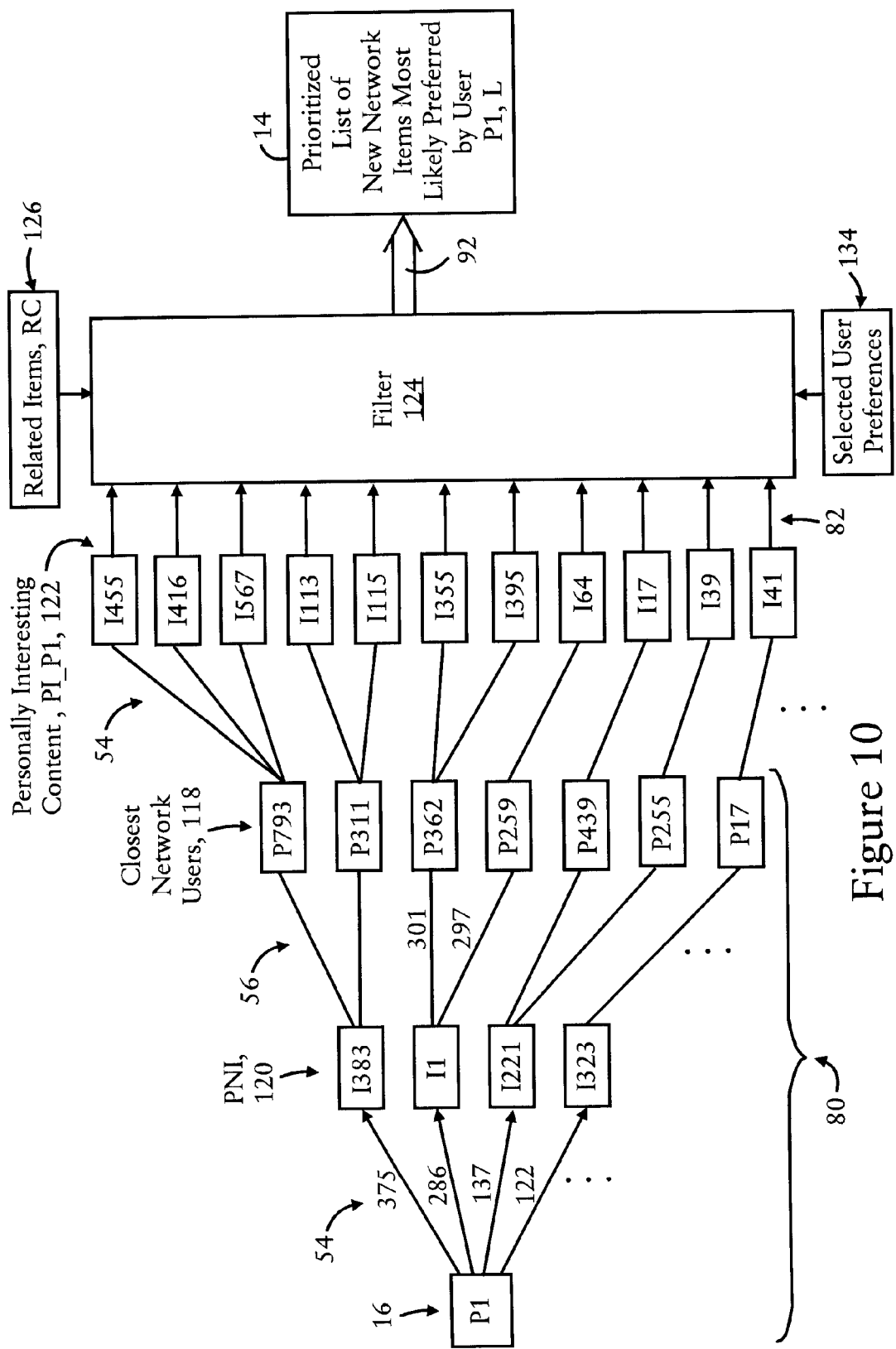
FIG. 10 illustrates generating the ordered list of network items most likely to be preferred by the identified user, with illustration of generating the personally interesting content for the identified user, according to an example embodiment.

The user-item relationships 48, stored for example by the processor circuit 22 in the user selection preferences 34 and illustrated below with respect to FIGS. 6 and 10, can demonstrate specific affinity values generated by the processor circuit 22 and that represent the available network items 58 presented to the user 16 for which the corresponding user 16 has expressed the greatest interest or affinity: the specific affinity values that demonstrate the relative affinity or "strength" of the user-item relationships 48 are illustrated in FIG. 6 as "item affinity values" 54.

The item-item relationships 50, which can be generated and stored by the processor circuit 22 in the item database 26, can demonstrate predetermined relationships between distinct network items, for example: relationships established between products and different accessories (for example, battery charger for a cellphone or other battery-operated device); relationships between similar video content based on the same actors, actresses, directors, etc.; music written and performed by the same performer, etc. The item-item relationships 50 also can demonstrate relationships determined by the processor circuit 22 based on analysis of network content and performing comparisons between network items. An example item-item relationship 50 can be expressed by an e-commerce website that presents a product "X" with a related product "Y" with the description that individuals who purchased "X" also purchased "Y". Example techniques for implementing item-item relationships 50 include domain specific knowledge: examples of implementing domain specific knowledge include the commercially available filtering offered by ChoiceStream (at the website address "choicestream.com"), which determines equivalents between movies, or ExpertSystems technology for determining similarity between concepts in text based content. Use of the item-item relationships 50 by the processor circuit 22 enables more efficient and faster determination of equivalence for new content (i.e., new network items) that are added to (i.e., made available to) the system 10. Such relationship analysis can be performed at any time, including when the network items are added to the system 10, when any user accesses the network items, or during background scans of content within the system 10.

As described below, item-item relationships 50 also can be used to establish similarity relationships for new network items that do not have any item-user relationships 52 relative to any network users. In particular, the processor circuit 22 can be configured for artificially creating a socially relevant gesture, referred to as a "similarity relationship", between a new network item (e.g., "IY" and an existing network item (e.g., "I1") having a well-established set of item-user relationships 52. Hence, the similarity relationship enables the processor circuit 22 to inject a new network item ("IY") into the item database 26 based on replicating the item-user relationships 52 of the existing network item ("I1"), for example based on multiplying the user affinity values 56 assigned to the existing network item ("I1") by a weighting factor specified in the similarity relationship and that specifies the "degree of similarity" (e.g., "1" equals 100 percent similar, "0.75" equals 75 percent similar, etc.).

The item-user relationships 52 can be determined and stored by the processor circuit 22 in the item database 26. The item-user relationships 52 can demonstrate for a given network item the relative affinity or "strength" of network users toward a given network item: the specific affinity values that demonstrate the "strength" of the item-user relationships 52 are illustrated in FIGS. 7, 10, 12 and 13 as "user affinity values" 56, where the network users having the strongest affinity toward a given network item 62 (based on their corresponding item affinity value 54) are identified within the item-user relationships 52. Hence, each item-user relationship 52 has a corresponding "mirroring" (i.e., converse) user-item relationship 48. Use of distinct databases for the relationships 48 and 52 provide more efficient mapping, although it is foreseeable that a single database could be used to construct the relationships 48 and 52, regardless of the direction of the mapping.

Any of the disclosed circuits of the recommendation server 18 (including the network interface circuit 20, the processor circuit 22, and the memory circuit 23 and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (for example, within the memory circuit 23) causes the processor circuit 22 to store application state variables in processor memory, creating an executable application resource (for example, an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 23 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (for example, in a transmit buffer).

Any reference to "outputting a message" or "outputting a packet" (or the like) also can include electrically transmitting (for example, via wired electric current or wireless electric field, as appropriate) the message/packet stored in the tangible memory medium to another network node via a communications medium (for example, a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (for example, in a receive buffer). Also note that the memory circuit 23 can be implemented dynamically by the processor circuit 22, for example based on memory address assignment and partitioning executed by the processor circuit 22. In addition, the processor circuit 22 can be implemented as a multi-processor system or based on a distributed server system.

Figure 3:
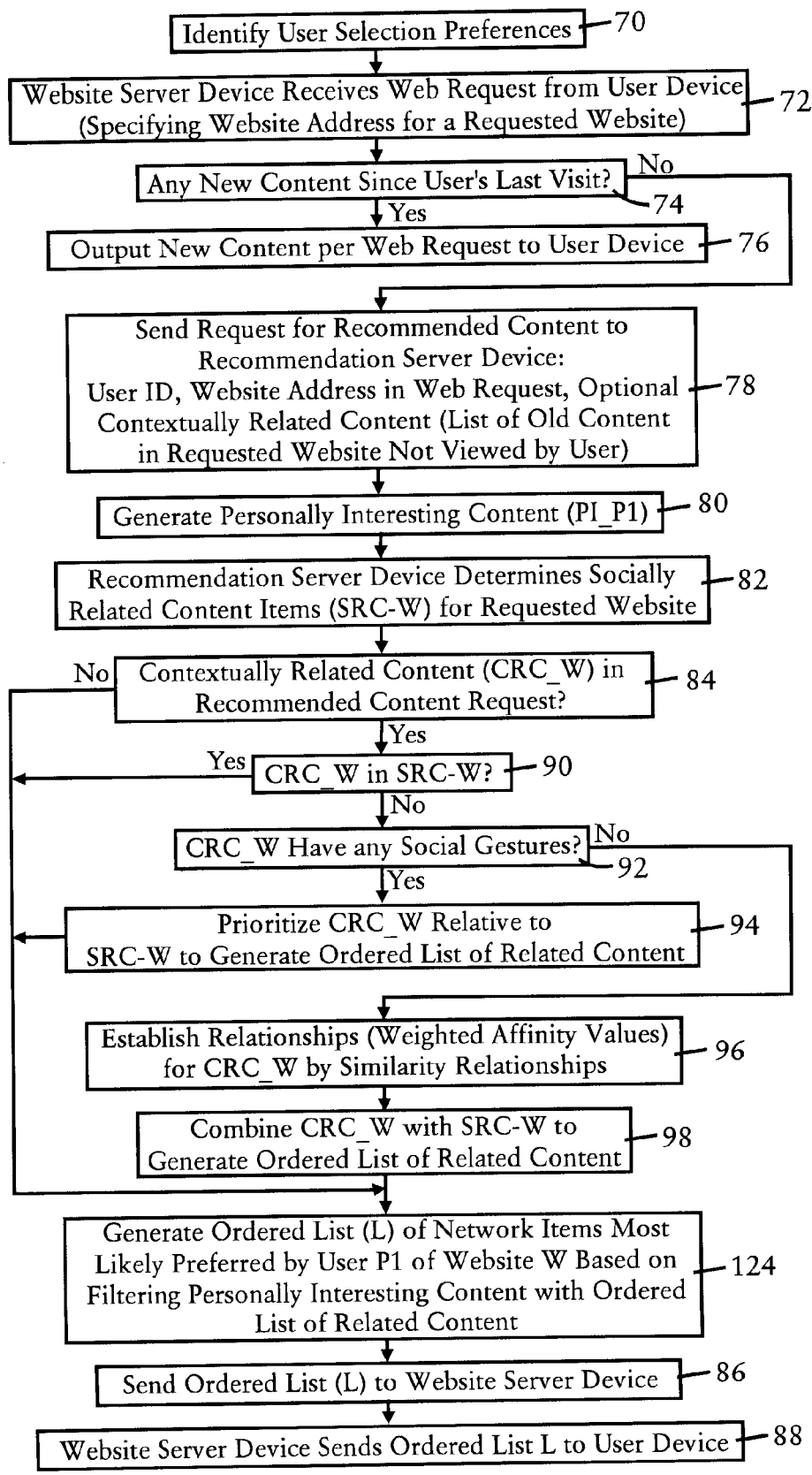
FIG. 3 illustrates a method by the system of FIG. 1 of generating the ordered list of network items most likely to be preferred by the identified user, according to an example embodiment.

FIG. 3 illustrates a method by the system of FIG. 1 of generating the ordered list of network items most likely to be preferred by the identified user, according to an example embodiment. The steps described in FIG. 3, as well as the steps described below with respect to FIGS. 8-13, can be implemented as executable code or encoded logic stored on a computer readable storage medium (e.g., floppy disk, hard disk, ROM, EEPROM, nonvolatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

Collecting User Selection Preferences

As described previously, the method begins with the identification of user selection preferences in step 70 based on an accumulation of user selection inputs executed by the identified user "P1" 16 and other users in the network (not shown) interacting with the network content. The user selection inputs can be accumulated by multiple network devices, for example the recommendation server 18, the website server device 12, or by another device within the network 11 configured for detecting user inputs. For example, in a distributed server system the network interface circuit 20 of the recommendation server 18 can receive a request from either the website server device 12 or another server (not shown) within the network 11 specifying the user request (e.g., an "echo" or copy of the user request), enabling the processor circuit 22 to update any one of the databases 24, 26, or 28 accordingly. The user (for example, "P1") 16 can be identified by the server 18 or another server (not shown) using different techniques, for example based on identifying a device address of the corresponding user device 15, a user identifier specified within the user request, an indicator identifying the physical or network presence of the user 16, etc. The processor circuit 22 in the server 18 (or another server in a distributed server system) can update the user selection preferences 34 in response to each input by the user 16 based on identifying the user selection input relative to the input options presented to the user identifying the respective available network items (i.e., the context of the corresponding user selection input), and any unselected input options indicating that the user 16 ignored these unselected input options. The identification of the user selection input relative to the context of input options presented to the user will be described in further detail with respect to FIGS. 4A and 4B.

Figure 4A:
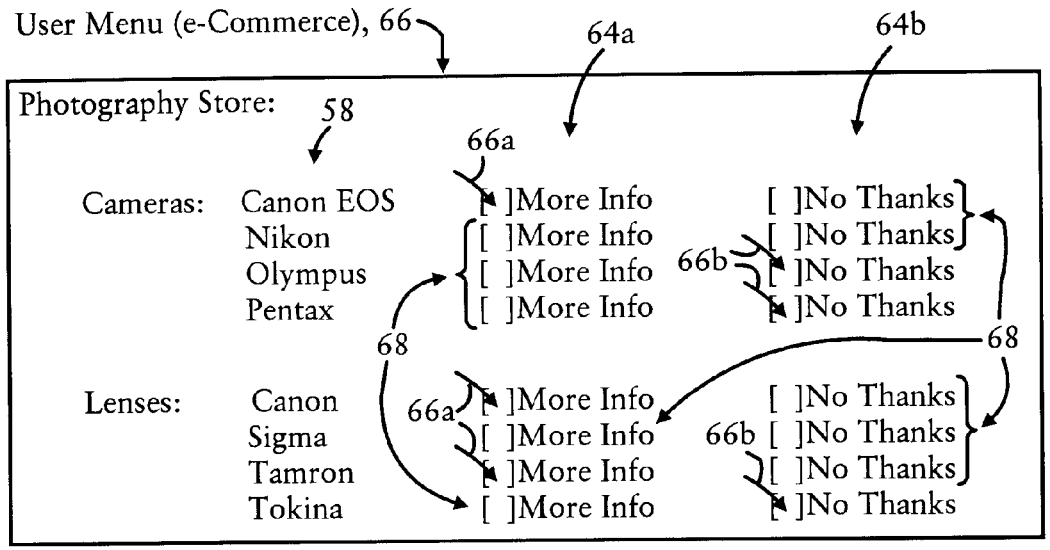
FIGS. 4A and 4B illustrate example input options presented to the user, user selection inputs executed by the user, and user input options that are not selected by the user.

FIG. 4A illustrates example input options 64 presented to the user 16 and identifying respective available network items (for example, identified content or tangible products). The input options 64 can be presented to the user 16, for example, in the form of one or multiple web pages that provide a user menu 66 of available products that can be purchased by the user 16. The user menu 66 illustrated in FIG. 4A illustrates multiple selections 66a and 66b that can be input over time by the user 16; hence, the user menu 66 illustrates an accumulation of multiple selections 66a and 66b that have been made by the user 16 for different network items 58. The processor circuit 22 can update the user selection preferences 34, illustrated in FIG. 5, in response to each input 66a or 66b by the user 16, including positive user selection inputs 66a indicating the user 16 has a stronger affinity toward the corresponding selected input option 64, and/or negative user selection inputs 66b indicating the user 16 has a weaker affinity toward the corresponding selected input options 64.

Hence, the user selection preferences 34 can be updated by the processor circuit 22 for each detected user input 66a, to indicate the network items for which the user has expressed a favorable affinity ("Likes") 100. As apparent from the foregoing, multiple requests for the same or similar items can cause respective updating of the user selection preferences that can indicate a stronger affinity toward a given network item 58.

As illustrated in FIG. 4A, the processor circuit 22 also can determine the context of the corresponding user selection input 66a or 66b by also identifying input options 68 within the presentation 66 of available network items 58 that have not been selected by the user 16. Hence, the processor circuit 22 can identify the input options 68 that were not selected by the user 16, but rather were ignored by the user 16 who favored either a positive selection 64a or a negative selection 64b, by adding to the user selection preferences 34 an "ignore" category 104 identifying the input options 68 that were not selected by the identified user 16.

Figure 4B:
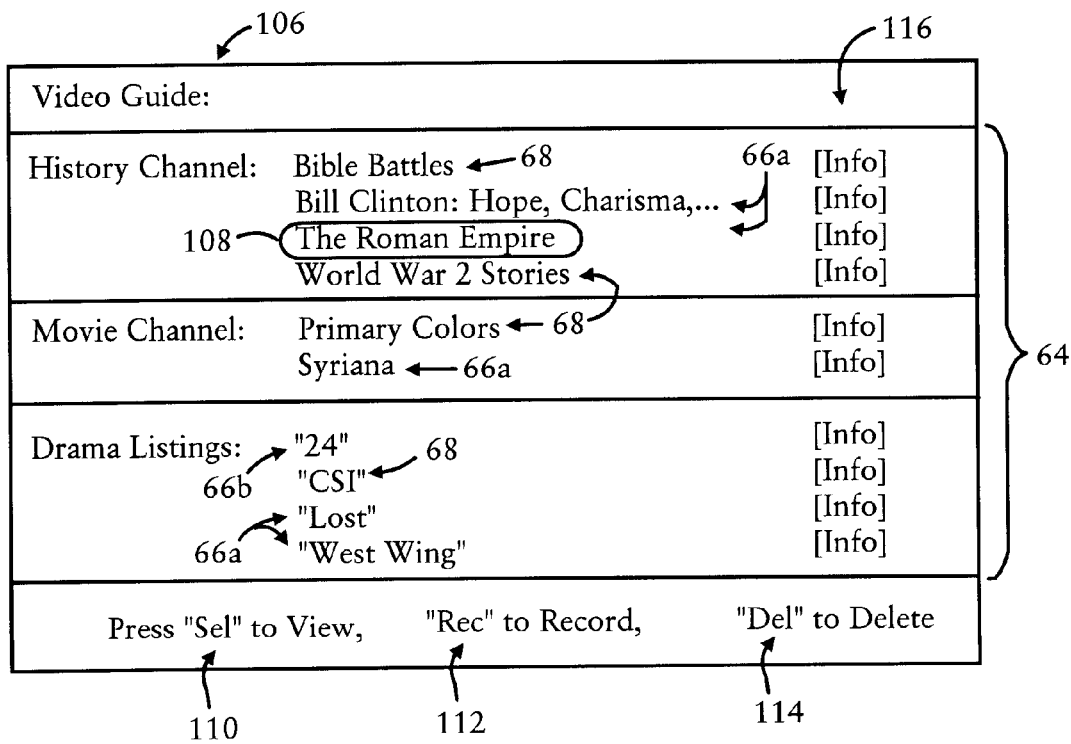

FIG. 4B illustrates additional input options 64 that can be presented to the user, for example in the form of a video guide 106. As illustrated in FIG. 4B, the user 16 can navigate the video guide 106 using the remote control 14a in order to highlight 108 a particular input option 64: in response to the user 16 pressing a selection key 110 to view the highlighted input option 108, the processor circuit 22 can update the user selection preferences 34 to indicate that the user 16 has expressed a positive affinity 100 toward the highlighted input option (for example, the documentary "The Roman Empire") 108, along with an identification of other network items 64 that were ignored by the user 16. As apparent from FIGS. 4A, 4B, and 5, various network items may be moved from the ignored category 104 to either the favorable affinity category 100 or the unfavorable affinity category 102 based on subsequent input selections by the user 16, for example in response to detecting the user 16 pressing the record key 112 (indicating a positive affinity 100 based on the corresponding positive user selection input 66a), or the user 16 pressing the delete key 114 (indicating a negative affinity 102 corresponding to the negative user selection input 66b expressed by the delete key 114). The processor circuit 22 also can update the user selection preferences 34 based on the user 16 requesting additional information 116 about a given input option 64.

Hence, the user selection preferences 34 can be updated by the processor circuit 22 in response to each corresponding user selection input (for example, 66a, 66b, 110, 112, 114).

The updated user selection preferences 34 can be used by the processor circuit 22 in the server 18 (or another distributed server) to generate in step 76 item affinity values 54 for the user ("P1") 16, illustrated in FIG. 6. In particular, the processor circuit 22 can parse the user selection preferences 34 in order to quantify the relative "strength" of the user 16 toward a given network item (identified by its item identifier 58) in the form of an item affinity value 54, where a higher value indicates a stronger relationship by the user 16 toward the corresponding item 58, a zero value indicates no preference for the corresponding item 58 (for example, the item has been ignored), and a larger negative member indicates a stronger dislike by the user 16 toward the corresponding item 58.

The processor circuit 22 also can be configured to detect a user selection input toward a network item already stored locally in a user device 15 (e.g., a personal computer, a CATV/Satellite set-top box, etc.) and indexed within the network 11. Examples of a network item already stored locally in the user device 15 and indexed within the network 11 include a media file that was previously requested by the user 162, and/or a media file that was automatically downloaded from the network 11 without a client request (for example, "pushed"), for example an electronic version of a "Book of the Month Club". Example user selection inputs toward the locally-stored network item can include viewing metadata related to the locally-stored network item (for example, within an online catalog or "guide" that identifies the locally-stored network item), consuming the locally-stored network item (for example, viewing or listening to the locally-stored network item), copying the locally-stored network item (for example, copying onto a portable player), sharing the locally-stored network item with another user, deleting the locally-stored network item, creating new network content (for example, comments), etc.

In response to the updating of the user selection preferences 34 (either by the same server 18 or another server in a distributed server environment), the processor circuit 22 can generate and/or update user affinity values 56 for each relevant network item 62 (illustrated in FIG. 7), for example each network item having a corresponding input option presented to the user. In particular, the processor circuit 22 can identify the user affinity values 56 for each network item 62 based on identifying the order of the highest item affinity values 54 (illustrated in FIG. 6) assigned by any of the network users 60, such that each user affinity value 56 of FIG. 7 identifies the corresponding affinity (for example, "301") by the corresponding network user (for example, "P362") 60 toward the corresponding network item (for example, "I1") 62. Hence, each user affinity value 56 is based on the corresponding user selection preference 34 for the corresponding user (for example, "P362").

The user affinity values 56 illustrated in FIG. 7 also can be updated without necessarily relying on the user selection preferences 34, for example in response to a detected user selection input that does not necessarily represent a "request" for an available network item. In particular, a detected user selection input can represent a socially relevant gesture of a user's preference toward an available network item, for example in the form of a subjective rating by the user about an available network item.

The socially relevant gesture of a user supplying a user selection input demonstrating a preference (very favorable or very unfavorable) regarding an available network item is considered more important than the actual value of the preference. In particular, conventional collaborative filtering systems rely on actual ratings values assigned by the users in order to predict users' tastes. Such conventional approaches for identifying users who share the same rating patterns with the active user rely on identifying users having chosen the same rating values for the same network items; in other words, conventional collaborative filtering systems establish user-user relationships based on identifying users sharing the same rating values for the same network items. Consequently, if a user "A" inputs a five-star rating for a given item "X" and a user "B" also inputs a five-star rating for the same item "X", conventional collaborative filtering systems would establish a relationship between the users "A" and "B" based on both users entering the same rating value (five stars) for the same item "X". Such collaborative filtering techniques have been used to determine cohorts (i.e., a group of individuals having similar tastes). An example of fixed cohorts (using fixed demographic data) is illustrated for example by the Claritas Prizm Clustering by Claritas, Inc., San Diego, Calif.

In contrast, the disclosed embodiment does not store rating values, nor does the disclosed embodiment necessarily rely on the ratings values assigned by users. In fact, actual ratings values have little value in determining recommendations (for example, due to subjective and inconsistent criteria that may be used even by the same user at different times). Rather, a more effective and reliable indication of a user's interest (favorable or negative) in a given network item is the detection of the user having exerted the effort to rate the network item. In other words, the detected existence of a rating for an item is more important than the rating value in determining the user's interest.

Hence, the processor circuit 22 can record the act of the user supplying a recommendation within a user selection input as a socially relevant gesture, based on updating an item affinity value 54 for a corresponding network item 58 in response to detecting the user selection input. For example, a user selection input specifying "one-star rating" (representing a most negative rating) by a user can cause the processor circuit 22 to apply a negative affinity weighting between the network user and the rated item (for example, reduce an existing item affinity value 54 by a prescribed amount of "−20"); in contrast, a user selection input specifying a "five-star rating" (representing the most positive rating) by the user can cause the processor circuit 22 to apply a positive affinity weighting to the rated network item (for example, increase the existing item affinity value 54 by a prescribed amount of "+25"); a rating in between the "one-star rating" and the "five star rating" can cause the processor circuit 22 to apply a nonzero affinity weighting in between the negative affinity value and the positive affinity value (for example, reduce the existing item affinity value 54 by a prescribed amount of "−2"). Hence, the detection of the most negative rating or the most positive rating by the user can cause the processor circuit 22 to detect the rating as a corresponding positive or negative socially relevant gesture having an identifiable affinity value.

The detection of an intermediate rating by the user in between the most negative rating and the most positive rating, however, is inherently unreliable in determining the user's interest; hence, the processor circuit 22 can detect the intermediate rating as a socially relevant gesture having a negligible affinity value indicating that the socially relevant gesture has minimal effect on determining the user interest. Hence, the processor circuit 22 can evaluate the value of the socially relevant gesture as a result of the rating input by the user, as opposed to the actual rating value input by the user, where a strong dislike or a strong like is more reliable and more meaningful than a moderate input. Once the rating operation is performed, the disclosed embodiment does not store the actual rating value, but rather records the socially relevant gesture of the user performing the rating operation within a certain context based on updating the corresponding item affinity value 54.

The recording of socially relevant gestures based on updating the corresponding item affinity value also enables the processor circuit 22 to accumulate multiple acts by the user of rating the same item at different instances. Hence, if a user supplies user inputs that assign the highest rating for a given network item on three separate instances (for example, over the course of a few days or weeks), the processor circuit 22 can increase the item affinity value 54 by that user toward the rated network item in response to each detected socially relevant gesture. Hence, each socially relevant gesture of assigning the highest rating to the network item causes a corresponding increase in the corresponding item affinity value 54, representing the user affinity toward the rated content. In contrast, conventional systems that rely on the value of the rating only will store the most recently entered rating value. Hence, the act of rating is considered significant as a socially relevant gesture, as opposed to the value of the rating.

Another example of accumulating multiple user selection inputs by the user, relative to ignored input options, can be a user selecting an input option after repeated instances of ignoring the input option during prior presentations. For example, if a user ignores an input option after five successive presentations, the corresponding item affinity value 54 can be reduced by a corresponding negative weighting based on the user ignoring the input option; however, if on the next successive presentation the user selects the previously-ignored input option, a much higher positive weighting can be added to the item affinity value 54 that outweighs the prior accumulated negative weightings, resulting in a net positive item affinity value 54.

Hence, the processor circuit 22 can identify a socially relevant gesture as increasing at least one item affinity value (also referred to as a positive socially relevant gesture) for example in response to a positive user selection input 66a, decreasing at least one item affinity value (also referred to as a negative socially relevant gesture) for example in response to a negative user selection input 66b, or generating little or no change in any item affinity value (also referred to as a neutral socially relevant gesture), described below.

A positive socially relevant gesture can be detected by the processor 22, for example, in response to a user 16 creating content, submitting positive comments on the content, providing a strong positive rating for the content (i.e., 5-star rating), or recommending the content to another user or to a group of users in an online community. Hence, example positive socially relevant gestures include a creation gesture that creates new network content, a comment gesture that inserts a comment into new or existing network content, a rate content gesture that provides a strong positive rating on the content, or a recommend content gesture that recommends the content to another user or group of users.

A neutral socially relevant gesture can be detected by the processor 22, for example, in response to a user 16 viewing the content, for example, for a brief interval indicating mild interest in the content (also referred to as a view gesture), or providing a neutral rating for the content, for example, 2-4 star rating out of a 1-5 star range (also referred to as a neutral rating gesture). Also note that the view gesture can be interpreted as either a positive socially relevant gesture, a neutral socially relevant gesture, or a negative socially relevant gesture, based on determining the duration of the viewing of the content as a percentage of the total duration of the content (for example, twenty percent or less is a negative socially relevant gesture, between twenty and seventy-five percent is a neutral socially relevant gesture, and above seventy-five percent is a positive socially relevant gesture).

A negative socially relevant gesture can be detected by the processor 22, for example, in response to a user 16 repeatedly ignoring content after multiple presentation offerings (also referred to as a multiple ignore gesture), submitting negative comments on the content or providing a strong negative rating, for example, a 1-star rating from the 5-star rating system (also referred to as a negative rating gesture), or abandoning viewing of the content (also referred to as an abandon view gesture).

Referring back to FIG. 3, after updating of the user selection preferences 34, the user-item relationships 48 and/or the item-user relationships 52 (and storage in the appropriate databases illustrated in FIG. 1), the processor circuit 22 of the server 18 can continue execution of the socially collaborative filtering 38, described below.

Generating Recommendations for a Web Server

Referring to FIG. 3, the website server device 12 receives in step 72 the web request 21 from the user device 15. As described previously, the web request 21 specifies the uniform resource identifier (URI) (e.g., "R") 31 that identifies the network content within the website service that is being requested by the user 16. The identifier 31 can specify the top-level domain name for the website service 30 for retrieval of the website home page, or a subdomain name for retrieval of a specific portion of the website service 30, for example a sports page or a financial page of a news service, or a bulletin board of a website. The identifier 31 also can specify a resource executable by the website server device 12 that causes the website server device 12 to dynamically generate the requested network content during runtime execution of the resource specified in the identifier 31.

The web request 21 also can specify a data structure 25 that identifies the user 16 by a user identifier (e.g., "P1"), and which can specify the last time that the user accessed the website service 30; alternately, the user identifier and/or last visit by the user 16 can be embedded in the URI sent by the user device 15. Hence, the website server device 12 can determine in step 74 whether any new content has been added to the website service 30 relative to the webpage identified by the request identifier 31. If in step 74 the website server device 12 determines that new content is available since the last visit by the user 16, the website server device 12 can output in step 76 the new content responsive to request 21 to the user device 15, along with the updated data structure 25.

The determination of whether there is any new content in step 74 can be based on the number of new network content items (NC) relative to a number of available network content items (AC) that can be concurrently presented to the user 16. For example, assume the website server device 12 can concurrently present three available content items (AC=3) (e.g., on a web page): if the website server device 12 detects five new network content item (NC=5), then the website server device 12 can output in step 76 three of the five new content items based on the greater availability of new content items relative to the number that can be presented (NC>AC).

In contrast, the website server device 12 can determine an absence of new network content items if there are less new network content items than the number that can be concurrently presented (NC<AC). If in step 74 the website server device 12 determines there is an absence of new network content added to the requested webpage (or the requested resource) since the user's last visit, i.e. the website server device 12 determines an absence of new network content within the website service 30 relative to the last prior access by the identified user 16 to the website service 30, the website server device 12 can send in step 78 the request 27 for recommended network content to the recommendation server device 18. As described previously, the request for recommended network content 27 can specify a user identifier 29, the website address 31 specified in the web request 21, and optionally contextually related content 33 that has not been viewed by the user 16.

The recommendation server 18 is configured for generating the ordered list 14 of network items most likely preferred by the user "P1" 16 in response to reception of the request 27, and based on executing socially collaborative filtering based on retrieval of the socially relevant gestures from the user database 24, the item database 26, and/or the community database 28. In particular, the network interface circuit 20 is configured for receiving the request 27 from the website server device 12 via the wide area network 11. In response to reception of the request 27, the processor circuit 22 is configured for generating in step 80 personally interesting content ("PI_P1") 122 for the identified user "P1" 16, where the personally interesting content "PI_P1" identifies new network items for which the identified user "P1" will most likely have the highest relative affinity values. The personally interesting content "PI_P1" 122 generated by the processor circuit 22 for the identified user "P1" 16 is described in further detail with respect to FIGS. 8-10.

Figure 8:
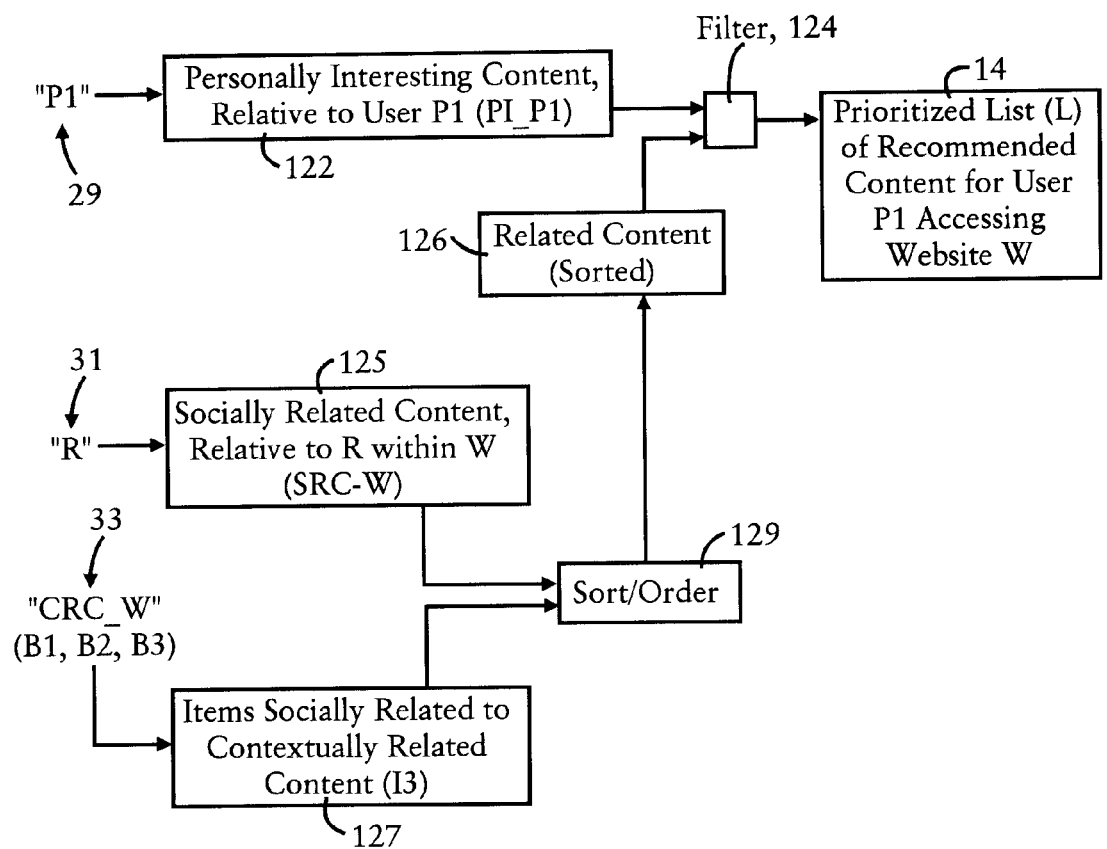
FIG. 8 summarizes generating an ordered list of network items most likely to be preferred by the identified user, based on filtering personally interesting content for the identified user relative to an ordered list of content related to the website service, according to an example embodiment.

FIG. 8 summarizes generating an ordered list 14 of network items most likely to be preferred by the identified user, based on filtering personally interesting content ("PI_P1") 122 for the identified user "P1" 16 relative to an ordered list ("RC") 126 of content related to the website service "W" 30, according to an example embodiment. FIG. 8 illustrates that the personally interesting content 122 is filtered (e.g., AND filtering) and/or sorted (e.g., weighted sorting) by the filter 124 in order to generate the prioritized list 14 of recommended content for the user "P1" 16 accessing the website service "W" 30. As described in further detail below, the personally interesting content ("PI_P1") 122 is filtered and/or sorted relative to the ordered list ("RC") 126 such that the prioritized list 14 identifies not only the new network items for which the identified user "P1" 16 will most likely have the highest relative affinity values, but also presents the prioritized list 14 in an order that is relevant to the network content requested by the user request 31.

As described in further detail below with respect to FIG. 12, the processor circuit 22 can generate socially related content ("SRC-W") 125 that identifies network items that are the most closely related to the user request "R" 31, based on identifying network users ("NU2") having the highest relative user affinity values toward the network content specified in the request 31, and identifying the preferred network items of each of those identified network users "NU2" based on their respective user selection preferences as expressed by their respective user-item relationships 48. Hence, the related content ("RC") 126 is based on the socially related content ("SRC-W") 125 relative to the user request "R" 31 for the network content provided within the website service "W" 30. If the request 27 from the website server device 12 does not include any contextually related content 33, but rather specifies only the user identifier 29 and the user request 31, then the related content 126 equals the socially related content 125.

As described previously, the website server device 12 can supply in the user request 27 contextually related content ("CRC_W") 33 that identifies content 35 that was not accessed by the user "P1" 16, for example content that might be unpopular or undesirable by most consumers of the website service 30. If the request 27 includes contextually related content ("CRC_W") 33, the processor circuit 22 can determine whether any of the contextually related content 33 should be included in the prioritized list 14 of recommended content based on identifying network items ("I3") 127 that are socially related to the contextually related content 33, and selectively sorting in step 129 selected items of the contextually related content 33 based on a determined convergence of relationships between identified network items in the socially related content 125 and identified items in the items ("I3") 127 socially related to the contextually related content ("CRC_W") 33. As illustrated in the drawings, the contextually related content can be expressed as identifiers for respective individual content items (e.g., "B1", "B2", "B3"), or as a singular reference (e.g., "B") to a class of content items.

FIG. 9 illustrates example attributes of the personally interesting content 122, the socially related content 125, and the contextually related content 33 illustrated in FIG. 8. As illustrated in FIGS. 9 and 10, the personally interesting content ("PI_P1") 122 is generated in step 80 of FIG. 3 based on the processor circuit 22 identifying socially relevant gestures by the identified user "P1" 16 toward preferred network items (PNI) 120 as expressed by the network items having the highest relative item affinity values 54. The socially relevant gestures by the identified user "P1" 16, retrieved by the processor circuit 22 from the user selection preferences 34 in the user database 24, can include gestures toward the first portion "A" 37 of the website service 30, representing the website content that was consumed (e.g., viewed, heard, downloaded, etc.) by the identified user "P1" 16.

In particular, the processor circuit 22 can identify the preferred network items 120 based on identifying, from the available network items 58 that have been presented to the user 16 based on the respective input options 64, the preferred network items (PNI) 120 having the highest relative item affinity values 54 generated for the identified user 16, as illustrated in FIG. 6 by the user-item relationships 48 indexed by the user "P1" 16. As described previously, the item affinity value 54 for a network item 58 is generated and updated (for example, by the processor circuit 22) in response to detecting socially relevant gestures associated with the network item (for example, multiple user selection inputs for viewing the item, purchasing the item, supplying a "5-star" rating), but does not include any rating value submitted by the user. Note that the preferred network items 120 can include all of the available network items 58 presented to the user, ordered based on the respective item affinity values 54, such that the highest affinity value item (for example "I383" in FIGS. 6 and 10) would be the first of the ordered list of preferred network items 120, and the lowest affinity value item (for example, "I65" in FIG. 6) would be at the end of the ordered list of preferred network items 120.

Hence, the preferred network items 120 that have the highest relative item affinity values 54 for the corresponding identified user ("P1") 16 can represent the available network items 58 for which the identified user ("P1") 16 has expressed the highest interest. If preferred, the list of preferred network items 120 can be filtered based on presentation context, business rules, etc.

The closest network users (NU1) 118 toward the preferred network items 120 (illustrated in FIGS. 9 and 10) can be identified by the processor circuit 22, based on those closest network users 118 having the highest relative user affinity values 56 toward each preferred network item (PNI) 120. The user affinity values 56 for each preferred network item 120 can be retrieved from the item database 26. Hence, the closest network users (NU1) 118 have the highest correlation of shared interests with the identified user ("P1") 16.

In particular, the processor circuit 22 can determine the group of closest network users (NU1) 118 (i.e., those network users 60 having the highest correlation of shared interests with the identified user "P1" 16) based on identifying the network users providing the highest relative user affinity values 56 for each of the preferred network items (PNI) 120 based on their respective user selection preferences 34. For example, the item "I1" 62 illustrated in FIG. 10 includes within its item-user relationships entry 52 in FIG. 7 the network users "P362", "P259", etc. having the highest respective user affinity values "301" and "297" 56. As illustrated in FIG. 10, the network users "P362" and "P259" are added by the processor circuit 22 to the list of closest network users (NU1) 118 based on their having the strongest relationship with the preferred network item "I1": the processor circuit 22 can repeat the identification of network users providing the highest relative user affinity values, for each of the preferred network items (PNI) 120 based on retrieving the corresponding entry 52, resulting in the collection of the closest network users 118 that have the highest correlation of shared interests with the identified user ("P1") 16. If desired, the list of the closest network users 118 also can be filtered based on presentation context, business rules, etc. as appropriate.

Following determination of the closest network users 118, the processor circuit 22 can identify the personally interesting content "PI-P1" 122 based on determining the preferred network items for each of the closest network users 118. The processor circuit 22 identifies the preferred network items for each of the closest network users 18 based on the respective item affinity values 54 exhibited by the respective users 118 according to their respective user selection preferences (for example, the respective user-item relationships 48). The resulting set of the preferred network items for each of the closest network users 118 can be filtered to include only items not yet seen by the user "P1" 16, resulting in a set of new network items ("PI-P1") 122 that are most likely to be preferred by the identified user "P1" 16. The identification of items "most likely to be preferred by the identified user" refers to those items determined as having the greatest probability of satisfy the user's interest (or preference) in network items. As described previously, the personally interesting content 122 also can include network items that have previously been presented to the user 16. Hence, the network items 122 also can be referred to as the most "personally interesting content" to the user 16.

Referring to FIG. 3, after generation of the personally interesting content "PI_P1" 122 in step 80, the processor circuit 22 can determine the appropriate presentation context for the identified user "P1" 16 relative to the network content requested in the user request 31 based on determining the related content "RC" 126 illustrated in FIG. 8. In particular, the processor circuit 22 of the recommendation server device 18 first determines in step 82 the socially related content "SRC-W" 125, illustrated in FIGS. 8, 9 and 12. The processor 22 determines the socially related content 125 based on identifying second network users ("NU-2") 61 having the highest relative user affinity values 56 toward the network content (e.g., "I9") 62 specified in the request "R" 31. FIG. 12 illustrates the request 31 as a request for the network content item "I9" 62.

Figure 12:
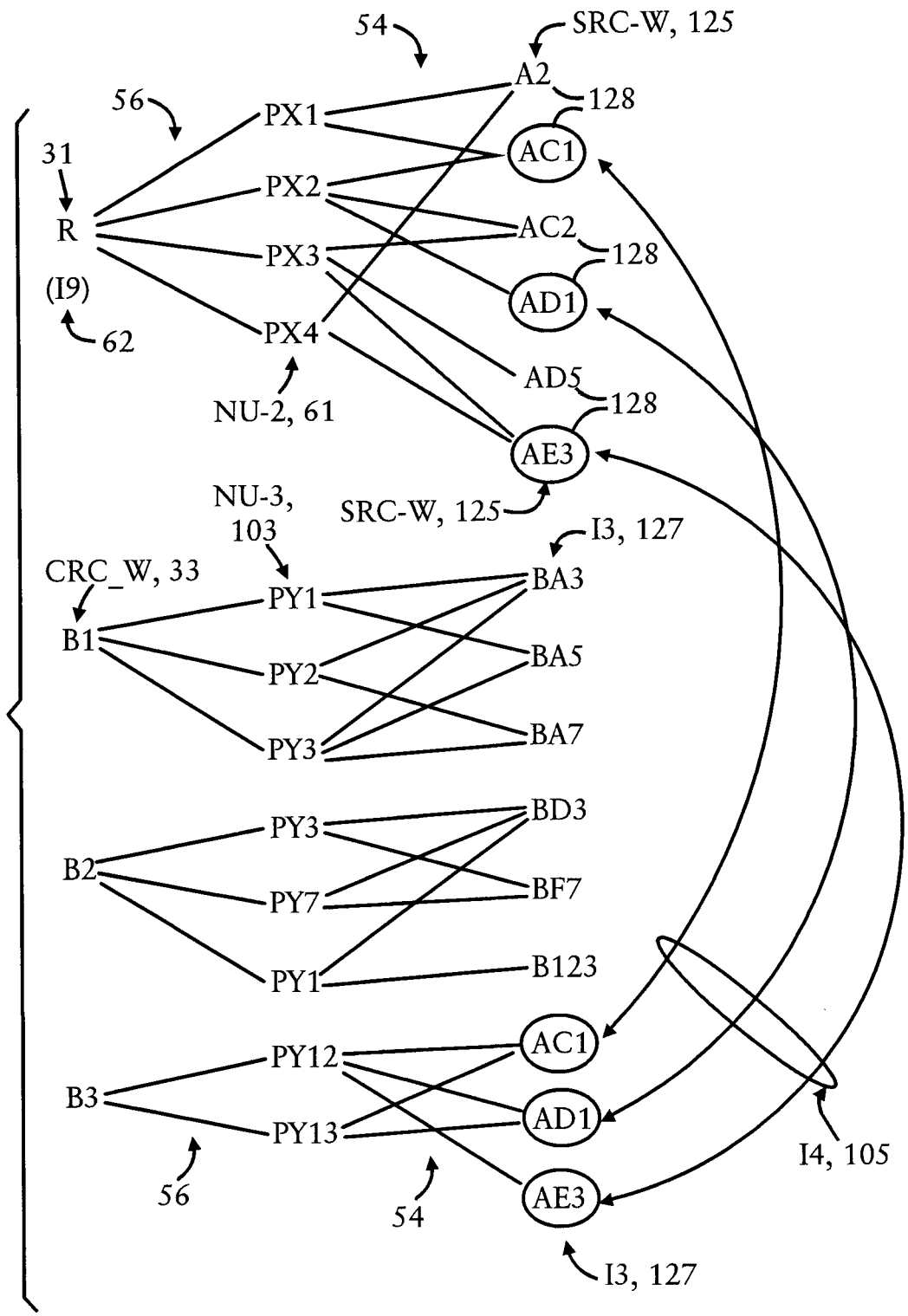
FIG. 12 illustrates generating the socially related content, and determining the convergence of relationships between the socially related content and items socially related to the contextually related content, according to an example embodiment.

FIG. 12 illustrates the processor circuit 22 determining the socially related content 125 relative to the user request 31. In other words, the processor circuit 22 determines, as the socially related content 125, a group 125 of network items 128 having the highest relation to the selected network item ("I9") 62. In particular, the processor circuit 22 can determine the socially related content 125 (i.e., the group 125 of network items 128 that have the highest relation to the selected available network item 62) based on identifying the second group "NU2" 61 of network users 60 having the highest relative user affinity values 56 for the selected available network item 62, illustrated in FIG. 7. The processor circuit 22 can identify, for each user 60 having the relatively highest relation 56 to the selected item 62 requested in the request "R" 31, the network items ("the second preferred network items") 128 that have the highest relative item affinity values 54 for each of the group of users 60 most closely associated with the selected item 62. If desired, another context-based filter can be applied to the group 125 of network items 128, as appropriate: for example, the socially related content 125 can be filtered to exclude the input set (i.e., the selected item "I9" 62), and network content (A) 37 at the website service 30 that already has been consumed by the identified user "P1" 16. The resulting socially related content 125 relative to the user request 31 includes the items 126 that are highly related to the selected item "I9" 62.

Hence, the item-based filtering illustrated in FIG. 12 as the generation of the socially related content 125 first identifies the group 61 of network users 60 having the highest relative user affinity values 56 for the selected available network item "I9" 62, and then identifies the network items 128 that have the highest relative item affinity values 54 for each of the group ("NU-2") 61 of users 60 most closely associated with the selected item "I9" 62. Hence, the item-based filtering illustrated in FIG. 12 can provide varying strengths of relationships between items. Consequently, the item-based filtering illustrated in FIG. 12 is distinct from conventional item-based collaborative filtering that rely on Boolean relationships between items, where relationships are expressed as an item-item matrix determining relationships between pairs of items (i.e., either there exists a relationship between the pair or there does not).

Referring to FIG. 3, after generation of the socially related content items 125 in step 82, the processor circuit 22 determines in step 84 whether any contextually related content ("CRC_W") 33 was specified in the recommended content request 27 from the website server device 12. Assuming in step 84 there was no contextually related content 33 specified in the request 27, then the socially related content 125 serves as the related content 126 in FIG. 8, causing the processor circuit 22 to execute the filtering operation in step 124 resulting in the ordered list 14 of network items most likely to be preferred by the identified user "P1" 16 relative to the presentation context of the request 31 supplied by the user 16 to the website service 30.

Hence, the filtering in step 124 applies the presentation context provided by the socially related content 125 (for example, performing an AND-based filtering between the personally interesting content 122 and the socially related content 125). As illustrated in FIG. 10, the processor circuit 22 also can apply selected user preferences 134 to the filter 124, for example the preferences specified in the user profile 32, age or content restrictions, scheduled preferences (for example, preferred morning news shows), browsing history, and/or business rules, etc. Hence, socially collaborative filtering can be implemented to provide personalized recommendations to a user based on user personal tastes that can be passively detected based on detecting socially relevant gestures by the user. The personalized recommendations can be updated in response to each detected input by the user, further providing context-appropriate recommendations.

The ordered list 14 generated by the processor circuit 22 is output in step 86 by the network interface circuit 20 of the recommendation server 18 to the website server device 12 via the wide area network 11. Hence, the website server device 12, in response to receiving the ordered list 14, sends in step 88 the ordered list 14 of network items for presentation to the identified user 16 within the context of the website service 30. Consequently, the user 16 is presented with the ordered list 14 within the context of the website service 30, providing the appearance that the website service 30 is presenting the ordered list 14 of new network items most likely preferred by the user. Further, all of the content identified in the ordered list 14 can be from sources that are distinct and external from the website service 30. As such, the operations between the website server device 12 and the recommendation server 18 of sending and receiving the request 27 and an ordered list 14 can be transparent to the user 16. Depending on implementation, the website server device 12 can present either the ordered list itself, or can fetch the content items specified in the ordered list 14, as appropriate.

Hence, the user 16 can enjoy content preferred content while visiting the website service 30, even if the website service 30 does not contain any new content since the last user visit.

Referring back to step 84 of FIG. 3, the foregoing description assumes that the request 27 from the website server device 12 did not specify any contextually related content 33 identifying a portion 35 of the content offered by the website service 30 but that was not accessed by the user 16. In particular, the website server device 12 may include the contextually related content 33 in order to enable the recommendation server 18 to determine whether any of the contextually related content 33 should be included in the prioritized list 14 of the network items most likely preferred by the user 16, or whether any of the contextually related content 33 would be so unpopular to the identified user 16 that it should be excluded from the prioritized list 14.

Assuming in step 84 that the request 27 included the contextually related content 33, the processor circuit 22 determines in step 90 whether any or all of the contextually related content 33 is identified within the socially related content 125 determined in step 82. If the contextually related content 33 is identified within the socially related content 125, indicating the network users "NU-2" 61 having the highest affinity toward the content "I9" 62 requested from the user request 31 also have a favorable affinity values toward the contextually related content 33, then the contextually related content that is already within the socially related content 125 is already applied in step 124 as described above, with no further analysis necessary.

Any one of the network items in the contextually related content 33 in step 90 that is not within the socially related content 125 indicates that the group of network users "NU-2" 61 having the highest affinity toward the item "I9" requested by the user 16 did not express any socially relevant gestures toward the contextually related content 33. Hence, the processor circuit 22 can determine whether the contextually related content should be added to the prioritized list 14 based on determining whether the contextually related content has any relationships with the socially related content 125.

In particular, if the processor circuit 22 determines in step 92 that the contextually related content 33 does not have any associated socially relevant gestures (e.g., item-user relationships 52 or user affinity values 56), the processor circuit 22 can artificially establish social relationships in step 96 based on establishing similarity relationships between the contextually related content 33 and other network items that have established item-user relationships 52. In particular, the processor circuit 22 can artificially create a "similarity relationship", between a new network item (e.g., "B5") and an existing network item (e.g., "I1") having a well-established set of item-user relationships 52. Hence, the similarity relationship enables the processor circuit 22 to inject a new network item ("B") into the item database 26 based on replicating the item-user relationships 52 of the existing network item ("I1"), for example based on multiplying the user affinity values 56 assigned to the existing network item ("I1") by a weighting factor specified in the similarity relationship and that specifies the "degree of similarity" (e.g., "1" equals 100 percent similar, "0.75" equals 75 percent similar, etc.). The similarity relationship can be established by the website server device 12, the processor circuit 22, or a network administrator. The similarity relationship can specify the new item (e.g., "B5"), the corresponding weighting factor (e.g., "W=0.75"), and the existing network item (e.g., "I1") to be used in establishing the similarity relationship (e.g., "B5" similar to "I1" by weighting factor "W=0.75"). As illustrated in FIG. 7, the user "P362" has a user affinity value 56 of "301" toward the item "I1"; hence, the processor circuit 22 can apply the similarity relationship between the content items "B5" and "I1" to establish a weighted user affinity value 56 for user "P362" of "224" (i.e., 30 1 multiplied by weighting factor of 0.75) toward the new item "B5".

Hence, the contextually related content 33, having the newly-created weighted affinity values based on the similarity relationships established in step 96, can be combined in step 98 with the socially related content 125 and ordered according to their respective affinity values in order to generate in step 98 of FIG. 3 (step 129 of FIG. 8) the ordered list of related content 126. The ordered list of related content 126 can then be filtered in step 124 to generate the ordered list 14.

The processor circuit 22 also can determine in step 92 whether any of the contextually related content 33 having socially relevant gestures should be added to the prioritized list 14 of new network items most likely preferred by the user "P1" 16, even though the contextually related content 33 is not within the list of socially related content 125. In particular, the socially related content 125 is based on identifying the second group of network users "NU-2" 61 having the highest relative affinity values 56 toward the content item "I9" 62 requested in the user request 31. Instances may arise, however, where content within the website service 30 that is unpopular or ignored by the group of network users "NU-2" may be more popular with another distinct group of network users "NU-3" 103 that ignore or dislike the requested network content item "I9".

Hence, the processor circuit 22 determines in step 94 how to prioritize the contextually related content 33 relative to the socially related content 125 in order to generate in step 129 the ordered list of related content 126. As described below with respect to FIGS. 11, 12 and 13, the processor circuit 22 determines the ordering of the ordered list of related content 126 based on determining whether there is any convergence of relationships between identified network items in the socially related content 125 and the contextually related content 33.

Figure 11:
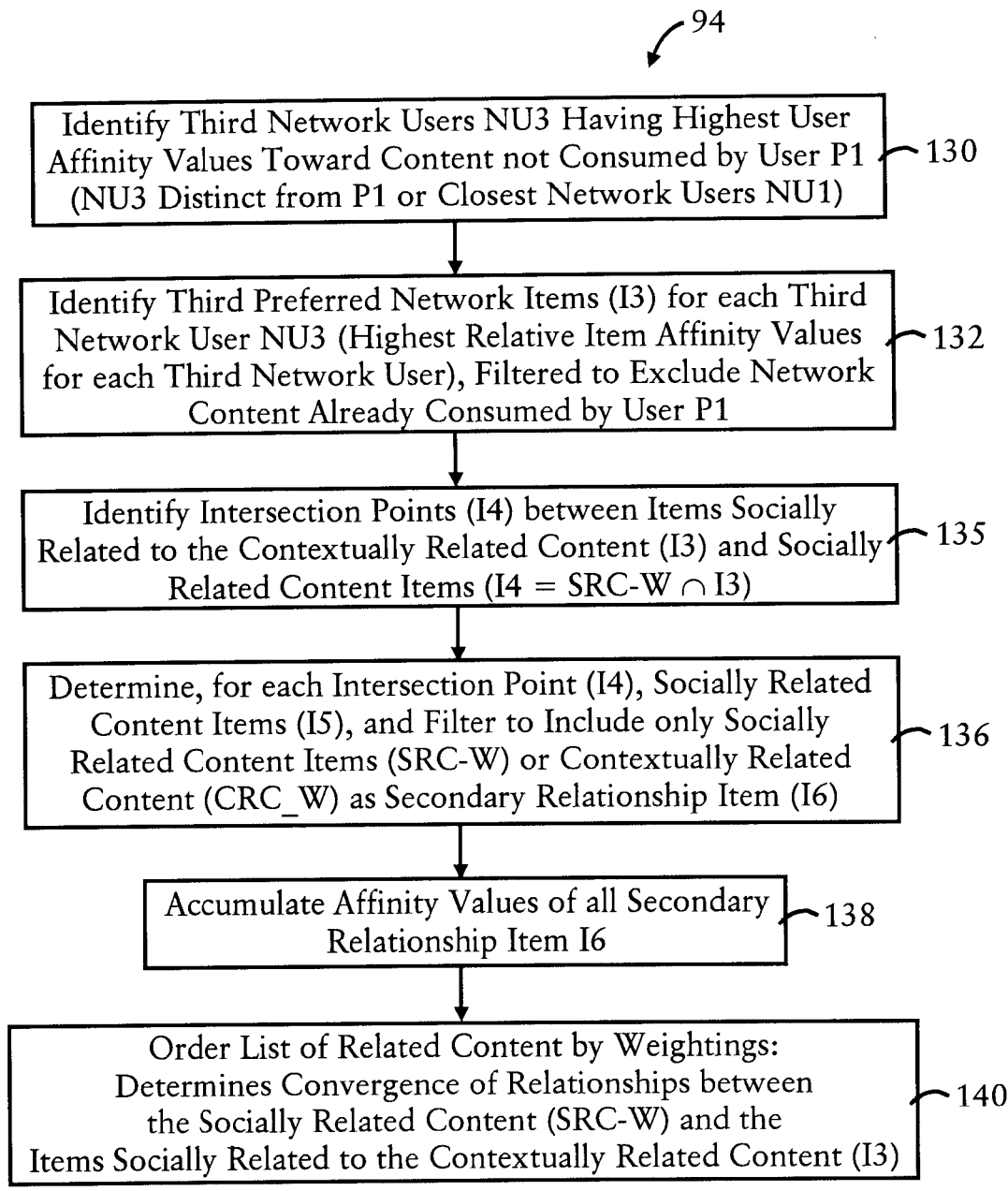
FIG. 11 illustrates the prioritizing of contextually related content relative to the socially related content to generate the ordered list of related content related to the website service, according to an example embodiment.
Figure 13:
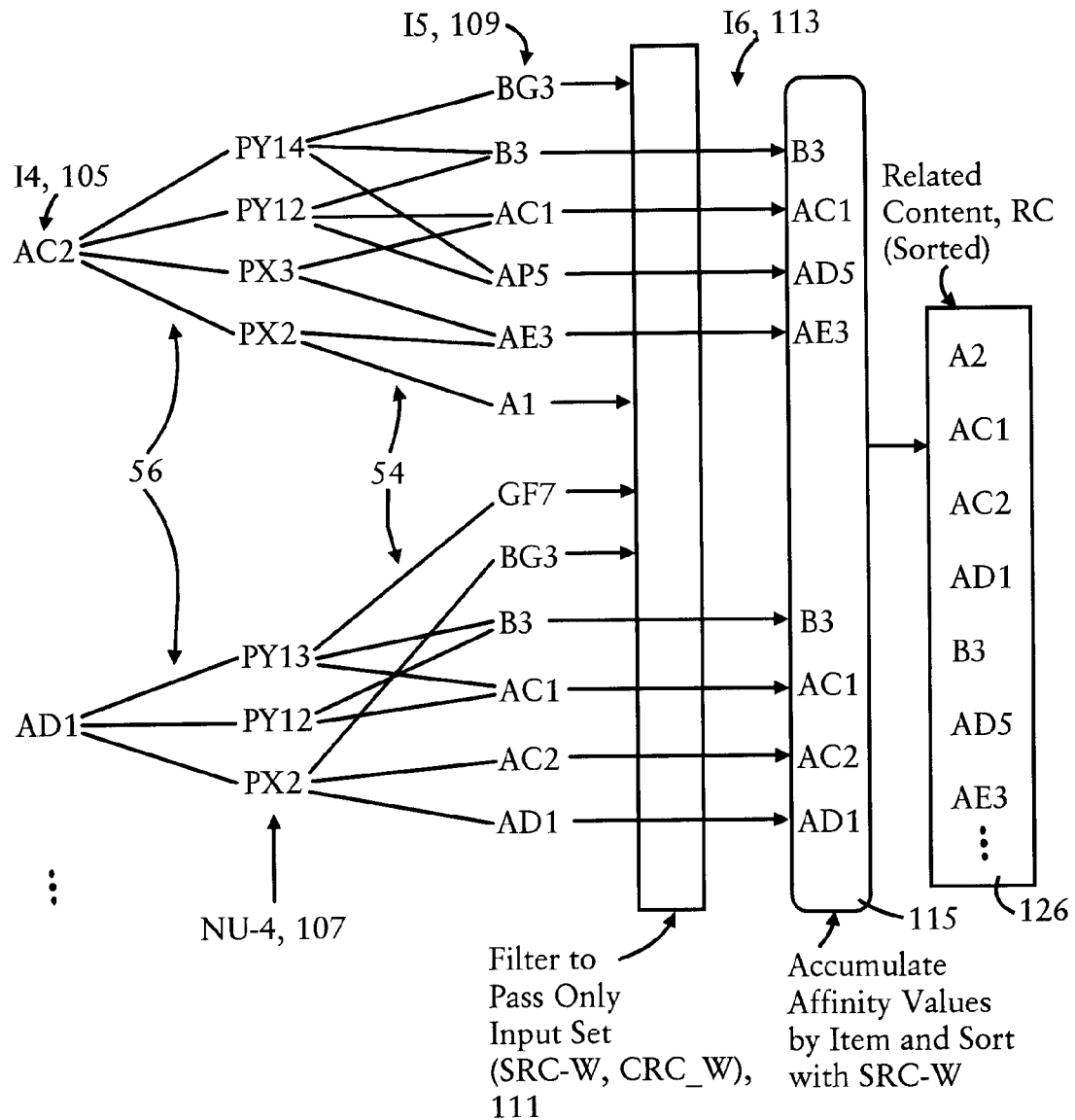
FIG. 13 illustrates in further detail the determining of the convergence of relationships based on a determined social correlation between intersecting network items between the socially related content in the contextually related content.

FIGS. 11, 12 and 13 illustrate the processor circuit 22 determining in step 94 whether there is any determined convergence of relationships between any of the network items 128 in the socially related content in the contextually related content 33. The processor circuit 22 first identifies in step 130 of FIG. 11, for each of the network items (e.g., "B1", "B2", "B3") specified within the contextually related content 33, the group of network users "NU-3" ("third network users") 103 having the highest relative user affinity values 56 toward the corresponding network item from the contextually related content 33. The processor circuit 22 identifies in step 132, among the third network users "NU-3" 103, the group of preferred network items "I3" for each of the third network users 103 based on the highest relative item affinity values 54 specified in the respective user-item relationships 48, resulting in the list of items "I3" 127 that are socially related to the contextually related content 33.

As illustrated in FIG. 12, certain network items 128 can be identified as present in both the set of personally interesting content 125, and within the set "I3" 127 of the items socially related to the contextually related content (e.g., contextually related content item "B3"), illustrated as network items "AC1", "AD1", and "AE3": the network items "AC1", "AD1", and "AE3" that are within both the socially related content 125 and the items "I3" 127 socially related to the contextually related content 33 are identified in step 135 by the processor circuit 22 as "intersecting network items" ("I4") 105 between the network items 127 and the socially related content items "SRC-W" 125.

Referring to FIGS. 11 and 13, the processor circuit 22 determines in step 136 whether there is a social correlation between the intersecting network items "I4" 105 and any one of the network items "B1", "B2", and "B3" specified in the contextually related content 33. For example, the processor circuit 22 determines, for the illustrated intersecting network items "AC2" and "AD1", the group of network users "NU-4" ("fourth network users") 107 having the highest relative user affinity values 56 toward the corresponding intersecting network item 105. The processor circuit 22 identifies in step 136, among the fourth network users "NU-4" 107, the group of preferred network items "I5" 109 for each of the fourth network users 107 based on the highest relative item affinity values 54 specified in the respective user-item relationships 48. The processor circuit 22 filters in step 111 the group of preferred network items "I5" 109 to exclude those network items that were not within the original input set of the socially related content 125 or the contextually related content 33, resulting in the converged network items "I6" (i.e., secondary relationship items) 113.

Hence, FIGS. 12 and 13 illustrate from the intersecting network items "I4" 105 and the converged network items "I6" 113 that the contextually related content item "B3" is socially related to the socially related content items "AC2" and "AD 1", resulting in a determined convergence via network users that need not necessarily be within the group of network users "NU-2" having the highest relative to affinity values toward the item "I9" 62 requested by the user 16 in the user request "R" 31. The processor circuit 22 can accumulate in step 138 of FIG. 11 and step 115 of FIG. 13 the affinity values by item, based on the relative number of occurrences of each of the items in the converged network items "I6" 113, and order in step 140 of FIG. 11 and step 115 of FIG. 13 the converged contextually related content item "B3" within the socially related content "SRC-W" 125, resulting in the ordered list of the related content 126. The ordered list of the related content 126 can then be applied in step 124, resulting in the ordered list (L) 14 that is ordered with the inclusion of the converged contextually related content item "B3" that otherwise might be missed by the user "P1" 16.

According to the disclosed embodiments, socially collaborative filtering can be applied to dynamically provide recommended content to a website service that requires new content to maintain a user interest. In addition, the use of socially collaborative filtering enables the same website service, regardless of the requested content, to obtain different content for different users expressing different interests according to their socially relevant gestures.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by a website server device providing a website service, a request from an identified user of a user device, the request requesting network content provided within the website service;
   determining by the website server device an absence of new network content within the website service relative to a last prior access by the identified user to the website service; and
   obtaining, by the website server device for presentation to the identified user within the website service, an ordered list of network items most likely to be preferred by the identified user, including sending by the website server device a recommendation request to a recommendation server via a network in response to the determined absence of new network content, and receiving the ordered list from the recommendation server via the network, wherein the ordered list is generated based on:
      identifying user selection preferences of the identified user based on an accumulation of user selection inputs executed by the identified user relative to input options presented to the user and identifying respective available network items, the user selection inputs including selections of a first portion of the network content within the website service and having been consumed by the user,
      determining first network users having a highest correlation of shared interests with the identified user based on identifying preferred network items from the available network items and having highest relative item affinity values generated for the identified user, and determining the first network users as providing highest relative user affinity values for the preferred network items,
      identifying, as personally interesting content for the identified user, the preferred network items for each of the first network users based on the respective user selection preferences, and
      filtering the personally interesting content for the identified user relative to socially related content, the socially related content determined based on identifying second network users having the highest relative user affinity values toward the network content specified in the request, and identifying second preferred network items for each of the second network users based on the respective user selection preferences;
   the filtering of the personally interesting content for the identified user relative to socially related content based on generating an ordered list of content related to the website service, the ordered list of content generated based on an ordered sorting of the socially related content with contextually related content, the contextually related content determined by the website server device identifying a second portion of the network content within the website service that has not been consumed by the user, wherein the ordered list of content is ordered based on a determined convergence of relationships between identified network items in the socially related content and the contextually related content;
wherein the determined convergence of relationships is identified based on:
identifying third network users having the highest relative user affinity values toward the second portion of the network content, and identifying third preferred network items for each of the third network users based on the respective user selection preferences, and
identifying an intersection of intersecting network items between the third preferred network items and the socially related content, and determining a social correlation between the intersecting network items and at least one of the contextually related content.

2. The method of claim 1, wherein the determined convergence is determined based on assigning, to at least one network item of the second portion, a corresponding affinity value based on a corresponding prescribed similarity relationship assigned to the corresponding network item relative to another network item in the socially related content, and based on a determined absence of any user affinity value toward the at least one network item of the second portion.

3. The method of claim 1, wherein the recommendation request identifies the identified user, the request requesting network content, and the contextually related content.

4. The method of claim 1, wherein the ordered list of network items is distinct from any of the network content having been provided within the website service.

5. A method comprising:
receiving, by a server device via a network, a recommendation request from a website server device having sent the recommendation request in response to a determined absence of new network content within a website service provided by the website server device, the recommendation request specifying an identified user having sent a request, via a user device and the network, to the website service, the request requesting network content that is provided within the website service;
generating by the server device an ordered list of network items most likely to be preferred by the identified user based on the network content requested by the user; and
sending the ordered list by the server device to the website server device for presentation within the website service of the ordered list to the identified user, wherein the ordered list is generated based on:
identifying user selection preferences of the identified user based on an accumulation of user selection inputs executed by the identified user relative to input options presented to the user and identifying respective available network items, the user selection inputs including selections of a first portion of the network content within the website service and having been consumed by the user,
determining first network users having a highest correlation of shared interests with the identified user based on identifying preferred network items from the available network items and having highest relative item affinity values generated for the identified user, and determining the first network users as providing highest relative user affinity values for the preferred network items,
identifying, as personally interesting content for the identified user, the preferred network items for each of the first network users based on the respective user selection preferences, and
filtering the personally interesting content for the identified user relative to socially related content, the socially related content determined based on identifying second network users having the highest relative user affinity values toward the network content specified in the request, and identifying second preferred network items for each of the second network users based on the respective user selection preferences;
the filtering of the personally interesting content for the identified user relative to socially related content based on generating an ordered list of content related to the website service, the ordered list of content generated based on an ordered sorting of the socially related content with contextually related content, the contextually related content specified in the recommendation request and identifying a second portion of the network content within the website service that has not been consumed by the user, wherein the ordered list of content is ordered based on a determined convergence of relationships between identified network items in the socially related content and the contextually related content;
wherein the determined convergence of relationships is identified based on:
identifying third network users having the highest relative user affinity values toward the second portion of the network content, and identifying third preferred network items for each of the third network users based on the respective user selection preferences, and
identifying an intersection of intersecting network items between the third preferred network items and the socially related content, and determining a social correlation between the intersecting network items and at least one of the contextually related content.

6. The method of claim 5, wherein the determined convergence is determined based on assigning, to at least one network item of the second portion, a corresponding affinity value based on a corresponding prescribed similarity relationship assigned to the corresponding network item relative to another network item in the socially related content, and based on a determined absence of any user affinity value toward the at least one network item of the second portion.

7. The method of claim 5, wherein the ordered list of network items is distinct from any of the network content having been provided within the website service.

8. An apparatus comprising:
a network interface circuit configured for receiving, via a network, a recommendation request from a website server device having sent the recommendation request in response to a determined absence of new network content within a website service provided by the website server device, the recommendation request specifying an identified user having sent a request, via a user device and the network, to the website service, the request requesting network content that is provided within the website service; and
a processor circuit configured for generating an ordered list of network items most likely to be preferred by the identified user based on the network content requested by the user;
the network interface circuit configured for sending the ordered list to the website server device for presentation within the website service of the ordered list to the identified user, wherein the ordered list is generated based on:

identifying user selection preferences of the identified user based on an accumulation of user selection inputs executed by the identified user relative to input options presented to the user and identifying respective available network items, the user selection inputs including selections of a first portion of the network content within the website service and having been consumed by the user, determining first network users having a highest correlation of shared interests with the identified user based on identifying preferred network items from the available network items and having highest relative item affinity values generated for the identified user, and determining the first network users as providing highest relative user affinity values for the preferred network items, identifying, as personally interesting content for the identified user, the preferred network items for each of the first network users based on the respective user selection preferences, and filtering the personally interesting content for the identified user relative to socially related content, the socially related content determined based on identifying second network users having the highest relative user affinity values toward the network content specified in the request, and identifying second preferred network items for each of the second network users based on the respective user selection preferences;

the filtering of the personally interesting content for the identified user relative to socially related content based on generating an ordered list of content related to the website service, the ordered list of content generated based on an ordered sorting of the socially related content with contextually related content, the contextually related content specified in the recommendation request and identifying a second portion of the network content within the website service that has not been consumed by the user, wherein the ordered list of content is ordered based on a determined convergence of relationships between identified network items in the socially related content and the contextually related content;

wherein the determined convergence of relationships is identified based on:

identifying third network users having the highest relative user affinity values toward the second portion of the network content, and identifying third preferred network items for each of the third network users based on the respective user selection preferences, and identifying an intersection of intersecting network items between the third preferred network items and the socially related content, and determining a social correlation between the intersecting network items and at least one of the contextually related content.

9. The apparatus of claim 8, wherein the determined convergence is determined based on assigning, to at least one network item of the second portion, a corresponding affinity value based on a corresponding prescribed similarity relationship assigned to the corresponding network item relative to another network item in the socially related content, and based on a determined absence of any user affinity value toward the at least one network item of the second portion.

10. The apparatus of claim 8, wherein the ordered list of network items is distinct from any of the network content having been provided within the website service.

11. An apparatus comprising:

a network interface circuit configured for receiving a recommendation request from a website server device having sent the recommendation request in response to a determined absence of new network content within a website service provided by the website server device, the recommendation request specifying an identified user having sent a request, via a user device and the network, to the website service, the request requesting network content that is provided within the website service; and means for generating an ordered list of network items most likely to be preferred by the identified user based on the network content requested by the user;

the network interface circuit configured for sending the ordered list to the website server device for presentation within the website service of the ordered list to the identified user, wherein the ordered list is generated based on:

identifying user selection preferences of the identified user based on an accumulation of user selection inputs executed by the identified user relative to input options presented to the user and identifying respective available network items, the user selection inputs including selections of a first portion of the network content within the website service and having been consumed by the user, determining first network users having a highest correlation of shared interests with the identified user based on identifying preferred network items from the available network items and having highest relative item affinity values generated for the identified user, and determining the first network users as providing highest relative user affinity values for the preferred network items, identifying, as personally interesting content for the identified user, the preferred network items for each of the first network users based on the respective user selection preferences, and filtering the personally interesting content for the identified user relative to socially related content, the socially related content determined based on identifying second network users having the highest relative user affinity values toward the network content specified in the request, and identifying second preferred network items for each of the second network users based on the respective user selection preferences;

the filtering of the personally interesting content for the identified user relative to socially related content based on generating an ordered list of content related to the website service, the ordered list of content generated based on an ordered sorting of the socially related content with contextually related content, the contextually related content specified in the recommendation request and identifying a second portion of the network content within the website service that has not been consumed by the user, wherein the ordered list of content is ordered based on a determined convergence of relationships between identified network items in the socially related content and the contextually related content;

wherein the determined convergence of relationships is identified based on:

identifying third network users having the highest relative user affinity values toward the second portion of the network content, and identifying third preferred network items for each of the third network users based on the respective user selection preferences, and identifying an intersection of intersecting network items between the third preferred network items and the socially related content, and determining a social correlation between the intersecting network items and at least one of the contextually related content.

12. Logic encoded in one or more non-transitory tangible media for execution and when executed operable for:

receiving, by a server device via a network, a recommendation request from a website server device having sent the recommendation request in response to a determined absence of new network content within a website service provided by the website server device, the recommendation request specifying an identified user having sent a request, via a user device and the network, to the website service, the request requesting network content that is provided within the website service;

generating by the server device an ordered list of network items most likely to be preferred by the identified user based on the network content requested by the user; and sending the ordered list by the server device to the website server device for presentation within the website service of the ordered list to the identified user, wherein the ordered list is generated based on:

identifying user selection preferences of the identified user based on an accumulation of user selection inputs executed by the identified user relative to input options presented to the user and identifying respective available network items, the user selection inputs including selections of a first portion of the network content within the website service and having been consumed by the user, determining first network users having a highest correlation of shared interests with the identified user based on identifying preferred network items from the available network items and having highest relative item affinity values generated for the identified user, and determining the first network users as providing highest relative user affinity values for the preferred network items, identifying, as personally interesting content for the identified user, the preferred network items for each of the first network users based on the respective user selection preferences, and filtering the personally interesting content for the identified user relative to socially related content, the socially related content determined based on identifying second network users having the highest relative user affinity values toward the network content specified in the request, and identifying second preferred network items for each of the second network users based on the respective user selection preferences;

the filtering of the personally interesting content for the identified user relative to socially related content based on generating an ordered list of content related to the website service, the ordered list of content generated based on an ordered sorting of the socially related content with contextually related content, the contextually related content specified in the recommendation request and identifying a second portion of the network content within the website service that has not been consumed by the user, wherein the ordered list of content is ordered based on a determined convergence of relationships between identified network items in the socially related content and the contextually related content;

wherein the determined convergence of relationships is identified based on:

identifying third network users having the highest relative user affinity values toward the second portion of the network content, and identifying third preferred network items for each of the third network users based on the respective user selection preferences, and identifying an intersection of intersecting network items between the third preferred network items and the socially related content, and determining a social correlation between the intersecting network items and at least one of the contextually related content.

\* \* \* \* \*